United States Patent
Salour et al.

(10) Patent No.: US 9,740,897 B1
(45) Date of Patent: Aug. 22, 2017

(54) INVENTORY MANAGEMENT SYSTEM AND METHOD

(71) Applicant: The Boeing Company, Chicago, IL (US)

(72) Inventors: Ali Salour, Fenton, MO (US); Douglas Trimble, Saint Peters, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/243,758

(22) Filed: Aug. 22, 2016

(51) Int. Cl.
*G06F 19/00* (2011.01)
*G06Q 30/00* (2012.01)
*G06Q 90/00* (2006.01)
*G06K 7/10* (2006.01)

(52) U.S. Cl.
CPC ..... *G06K 7/10366* (2013.01); *G06K 7/10316* (2013.01)

(58) Field of Classification Search
CPC ......... G06F 19/00; G06F 17/00; G06Q 30/00; G06Q 90/00; H04Q 5/22; G08B 13/14
USPC ...................... 235/385, 375; 340/10.1, 572.1
See application file for complete search history.

(56) References Cited

U.S. PATENT DOCUMENTS

| | | | |
|---|---|---|---|
| 6,829,520 B1 | 12/2004 | Green | |
| 2003/0174099 A1* | 9/2003 | Bauer | G06K 7/0008 343/893 |
| 2008/0068173 A1* | 3/2008 | Alexis | H01Q 1/2208 340/572.7 |
| 2008/0266092 A1* | 10/2008 | Campero | G01S 13/82 340/572.1 |
| 2011/0095087 A1* | 4/2011 | Master | B65D 19/38 235/385 |
| 2012/0194322 A1* | 8/2012 | Batra | G06K 19/0723 340/10.33 |
| 2015/0073899 A1* | 3/2015 | Carpenter | B62B 3/1408 705/14.49 |
| 2015/0324681 A1* | 11/2015 | Mats | G06K 19/07766 235/492 |

* cited by examiner

*Primary Examiner* — Edwyn Labaze

(57) ABSTRACT

An inventory management system includes an RFID reader, a multiplexing device operably connected to the RFID reader, and a plurality of shelving units. Each shelving unit has an outer boundary defined at least in part by RF blocking material. The inventory management system additionally includes a plurality of shelf antennas multiplexed to the RFID reader via the multiplexing device. At least one shelf antenna is routed within each shelving unit and tuned such that only RFID tags within the outer boundary of the shelving unit respond to an interrogation signal.

29 Claims, 16 Drawing Sheets

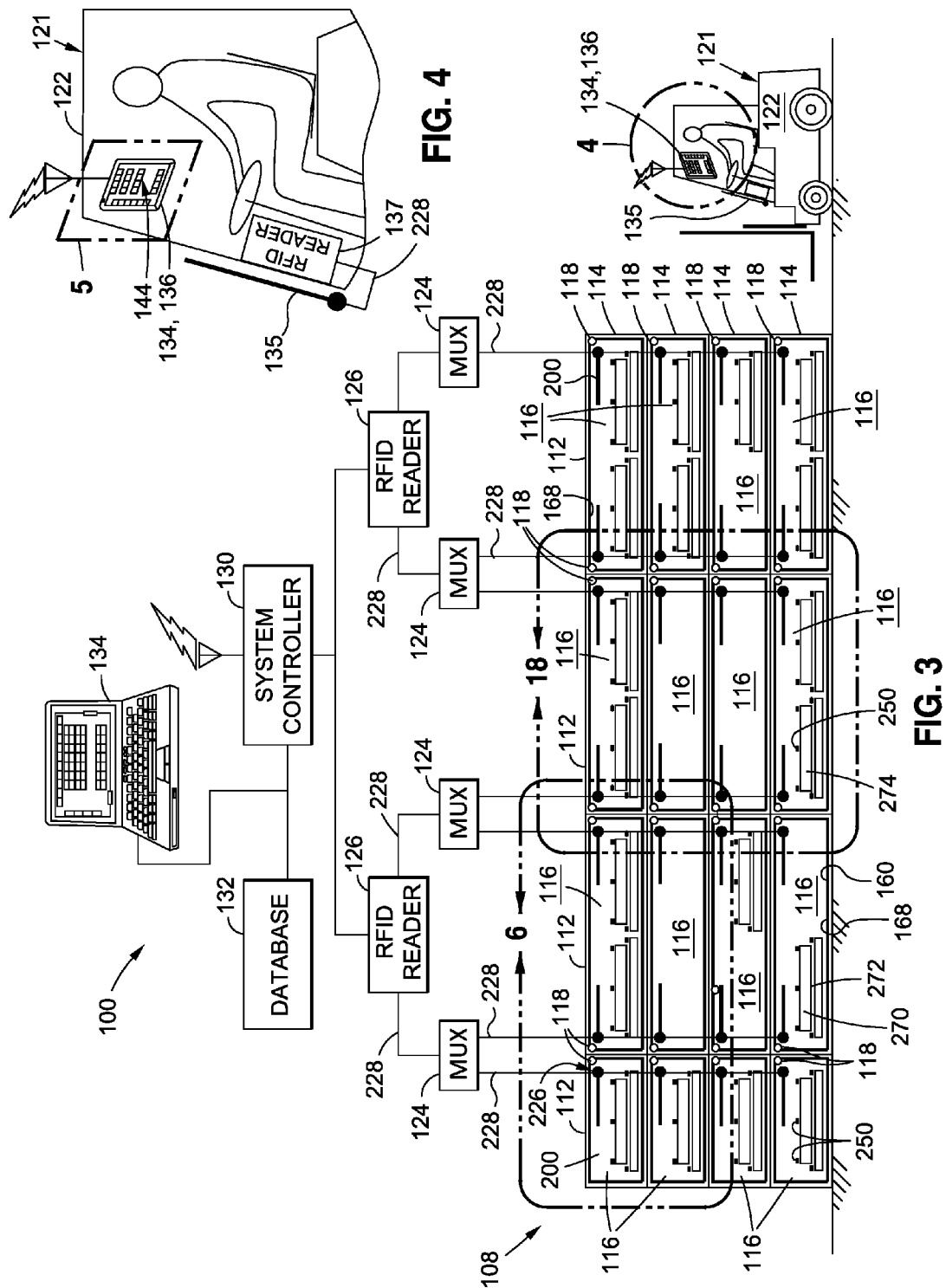

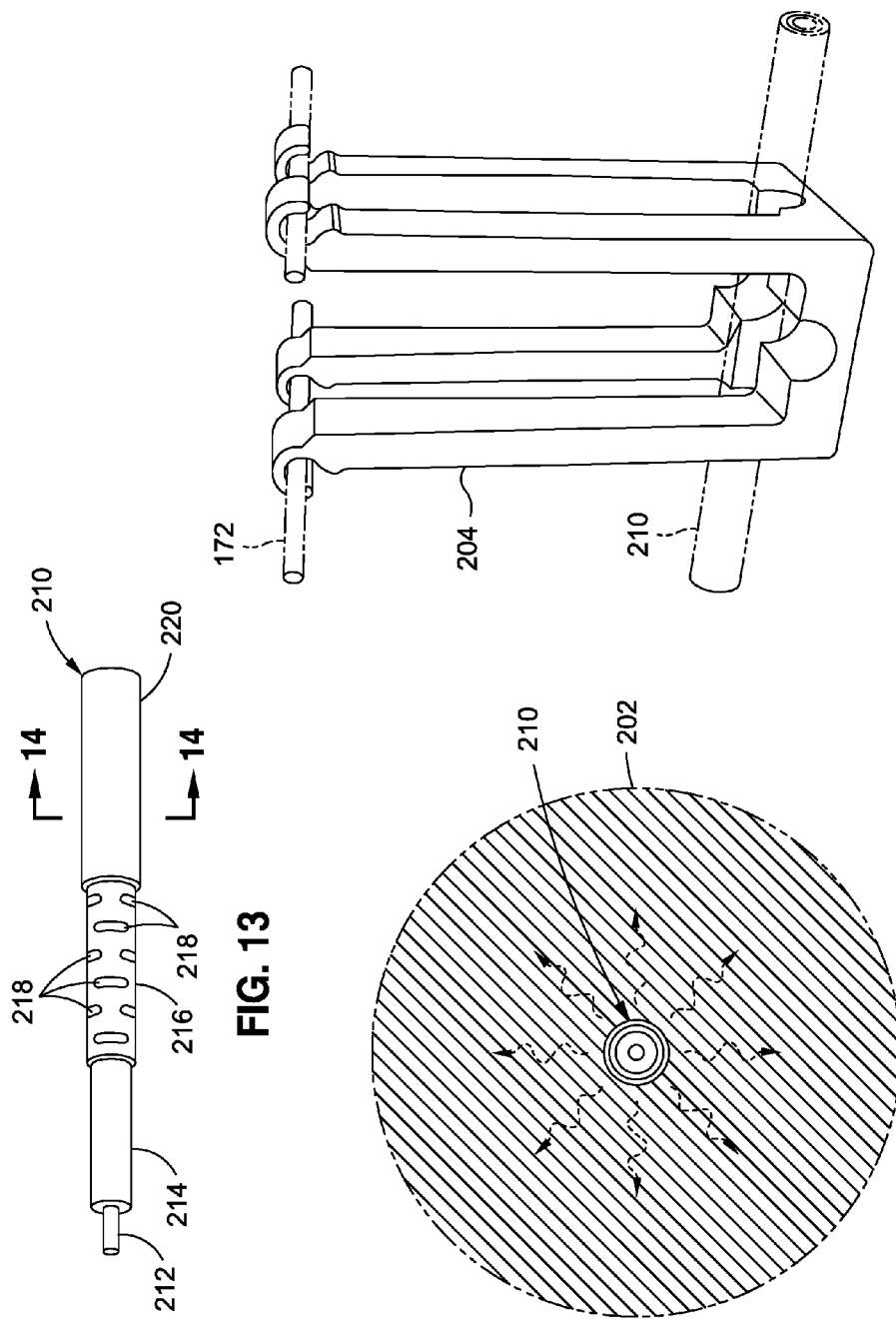

INVENTORY MANAGEMENT SYSTEM AND METHOD

FIELD

The present disclosure relates generally to inventory management and, more particularly, to a system and method for tracking items by position within a shelf system.

BACKGROUND

Certain materials used in the manufacturing of composite articles have a limited shelf life. For example, pre-impregnated fiber-reinforced polymer matrix material (i.e., prepreg) is typically provided in material rolls that must be stored at a relatively low temperature to prevent premature curing of the prepreg prior to layup and curing of the prepreg during the manufacturing of a composite article. In a specific example, certain epoxy/carbon-fiber prepregs must be maintained at a temperature of approximately −10 degrees F. to attain a maximum shelf life of 12 months. Upon reaching its maximum shelf life, the roll of prepreg must be consumed or discarded. Prepreg is typically stored in a freezer to maintain the prepreg at the recommended storage temperature for maximum shelf life. Each roll of prepreg is typically date-stamped when shipped from the supplier. The date stamp of each material roll must be recorded when received at the manufacturer to facilitate the tracking of the remaining shelf life of the prepreg.

During a production program, a roll of prepreg may be removed from a freezer and taken to a composite layup area where a portion of the material may be removed for layup, after which the remainder of the material roll may be returned to the freezer. The amount of time that the prepreg is out of the freezer must also be recorded as out-time which may affect the shelf life of the prepreg. For large production programs such as for a commercial aircraft requiring a large quantity of different types of prepreg with high material-consumption rates, large capacity walk-in freezers are required for storing prepreg and other perishable materials. Such large capacity freezers are typically equipped with multiple storage racks each having a plurality of individual shelving units.

The current method for tracking each material roll includes recording the material type and remaining shelf life by monitoring the entrance and exit of materials from the freezer. The current record-keeping method relies on manual data entry, updating of spreadsheets, and physical inspections by material handlers when material rolls are moved in and out of the freezer. In this regard, the current method is tedious, error prone, and labor intensive for large capacity freezers with large material quantities and high material consumption rates. Furthermore, the current method does not provide a means for identifying the shelving unit containing the oldest material in the freezer. An additional drawback associated with the current method is that there is no way to determine the shortest travel distance from the freezer door to a specific shelving unit when retrieving and/or replacing material within the freezer, which would advantageously reduce the total amount of time spent moving inventory in and out of the freezer for a production program with high material consumption rates.

As can be seen, there exists a need in the art for an inventory management system and method that allows for improved tracking of perishable materials in an automated and cost-effective manner, and which additionally allows for quickly identifying the specific location within a storage area containing a desired material.

SUMMARY

The above-noted needs associated with inventory management are specifically addressed and alleviated by the present disclosure which provides an inventory management system having an RFID reader, a multiplexing device operably connected to the RFID reader, and a plurality of shelving units. Each shelving unit has an outer boundary defined at least in part by RF blocking material. The inventory management system includes a plurality of shelf antennas multiplexed to the RFID reader via the multiplexing device. Each shelving unit has at least one shelf antenna routed and tuned such that only RFID tags within the outer boundary of the shelving unit respond to an interrogation signal.

In a further embodiment, disclosed is an inventory management system having an RFID reader, a multiplexing device operably connected to the RFID reader, and a plurality of shelving units of a storage rack of a shelf system located in a refrigerated area. Each shelving unit has an outer boundary defined at least in part by RF blocking material. The inventory management system additionally includes a plurality of shelf antennas multiplexed to the RFID reader via the multiplexing device. At least one shelf antenna is routed within each shelving unit and tuned such that only RFID tags within the outer boundary of the shelving unit respond to an interrogation signal. The inventory management system also includes an indicator light associated with each one of the shelving units. Each indicator light is configured to illuminate for indicating a shelving unit containing a tracked item to be moved or for indicating a shelving unit into which a tracked item is to be placed.

Also disclosed is a method of managing inventory including the step of radiating an interrogation signal from a plurality of shelf antennas multiplexed to an RFID reader. At least one shelf antenna is routed within each one of a plurality of shelving units of a shelf system. Each shelving unit has an outer boundary defined at least in part by RF blocking material. The method additionally includes blocking, using the RF blocking material of each shelving unit, at least a portion of the interrogation signal radiated by the shelf antenna contained within the outer boundary. In addition, the method includes emitting, from one or more RFID tags located within each outer boundary and affixed to one or more tracked items, a response signal in response to the interrogation signal radiated by the shelf antenna contained within the outer boundary. Furthermore, the method includes blocking, using the RF blocking material of each shelving unit, at least a portion of the response signals emitted by the RFID tags within each outer boundary such that each shelf antenna receives only the response signals from the RFID tags located within the outer boundary containing the shelf antenna.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 3 is a side view of an example of a row of storage racks taken along line 3 of FIG. 2 and illustrating a plurality of shelving units each including at least one shelf antenna routed and tuned to radiate an interrogation signal in a manner activating one or more RFID tags mounted on a plurality of tracked items stored in different shelving units;

FIG. 4 is a view of a portable wireless device mounted to a forklift and illustrating the display of an electronic map identifying the location of a shelving unit containing a tracked item to be removed, or identifying the location of a shelving unit into which a tracked item (e.g., a new material roll) is to be placed;

FIG. 13 is a perspective view of a lengthwise portion of a leaky coaxial cable;

FIG. 14 is a cross-sectional view illustrating omni-directional radiation of an interrogation signal from a leaky coaxial cable;

FIG. 15 is a perspective view of an example of a shelf antenna mounting bracket for mounting a coaxial cable to a wire shelf;

DETAILED DESCRIPTION

Figure 1:
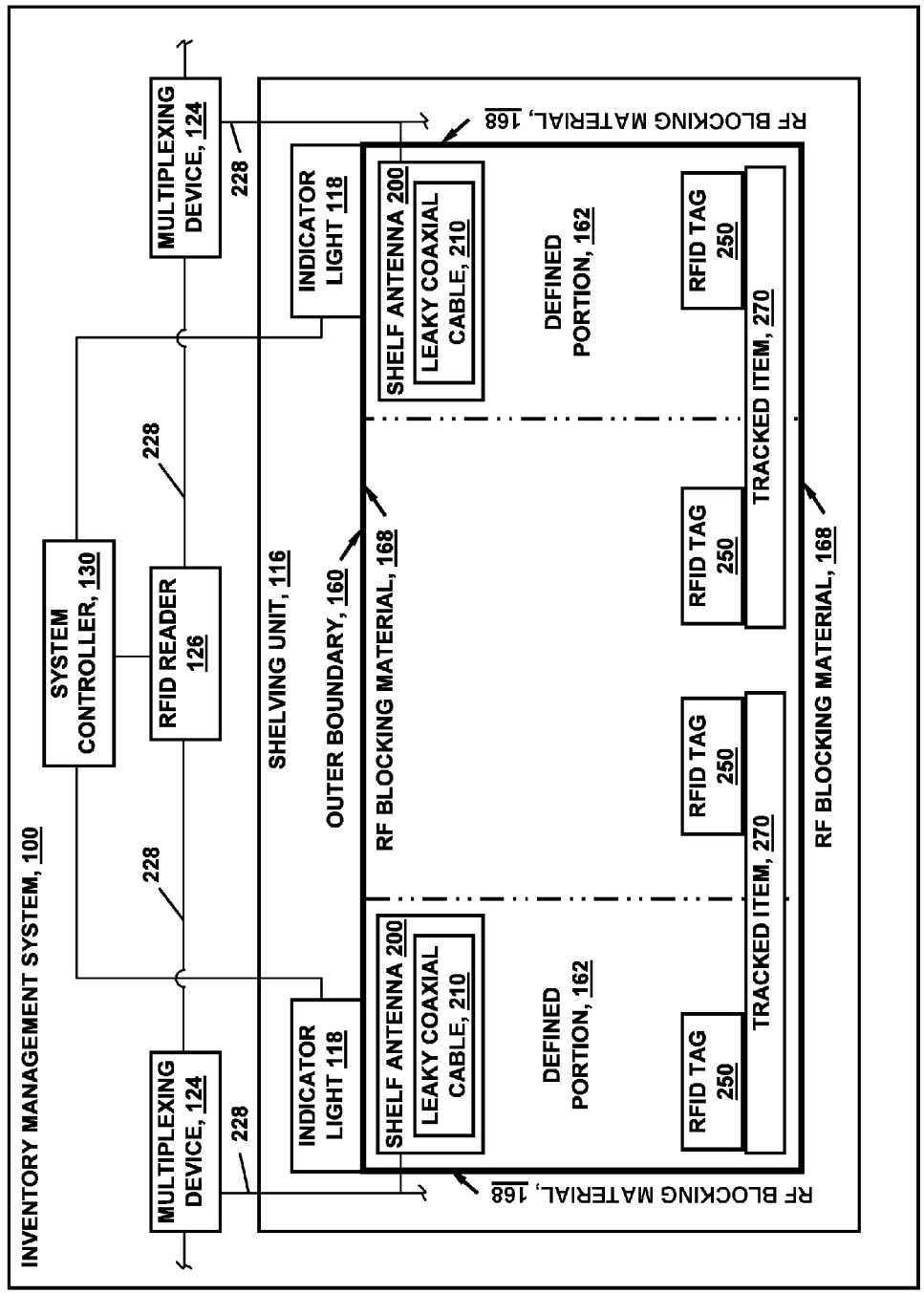
FIG. 1 is a block diagram of an inventory management system having a plurality of shelf antennas multiplexed to an RFID reader and routed within each one of a plurality of shelving units of a shelf system.

Referring now to the drawings wherein the showings are for purposes of illustrating various embodiments of the present disclosure, shown in FIG. 1 is a block diagram of an example of an inventory management system 100 incorporated into a shelf system 108. The shelf system 108 may include one or more storage racks 112 each having a plurality of shelving units 116 for storing a plurality of tracked items 270. Each tracked items 270 includes one or more RFID tags 250. The inventory management system 100 includes one or more tunable shelf antennas 200 associated with each shelving unit 116. Each one of the shelf antennas 200 is operably connected to an RFID reader 126 by a multiplexing device 124. Each shelf antenna 200 is configured to radiate an interrogation signal 202 (e.g., an RFID signal) generated by the RFID reader 126. RFID tags 250 that receive the interrogation signal 202 emit a response signal 252 which is received by the shelf antenna 200. The shelf antennas 200 are preferably omni-directional as described below, but may optionally be provided as directional antennas.

The shelving units 116 each have an outer boundary 160 defined at least in part by RF blocking material 168. The RF blocking material 168 may line the walls of each shelving unit 116. Alternatively, the RF blocking material 168 may form the load-bearing walls of the shelving unit 116. In some examples, the RF blocking material 168 is a conductive mesh 170 having a plurality of perforations to allow the passage of water such as from a sprinkler system. However, one or more portions of an outer boundary 160 may include RF blocking material 168 that is non-perforated (not shown).

Referring still to FIG. 1, the outer boundary 160 defined by the RF blocking material 168 forms a Faraday cage. The outer boundary 160 is open on at least one side to allow for the removal and replacement of tracked items 270 from each shelving unit 116. The RF blocking material 168 of each shelving unit 116 is configured to heavily attenuate or block the interrogation signals 202 radiated by the one or more shelf antennas 200 located within the outer boundary 160 of the shelving unit 116, in addition to blocking the interrogation signals 202 radiated by shelf antennas 200 located in other shelving units 116 including immediately adjacent shelving units 116, such as the shelving units 116 in the same storage rack 112. In addition, the RF blocking material 168 of each shelving unit 116 is configured to heavily attenuate or block response signals 252 (e.g., RFID signals) emitted by the RFID tags 250 located within the outer boundary 160, in addition to attenuating or blocking response signals 252 emitted by RFID tags 250 located within other shelving units 116 including immediately adjacent shelving units 116 of the same storage rack 112.

The one or more shelf antennas 200 within each shelving unit 116 are routed and tuned such that only RFID tags 250 within the outer boundary 160 of the shelving unit 116 respond to interrogation signals 202 radiated by the one or more shelf antennas 200 in the shelving unit 116. In one example (FIG. 8), a shelving unit 116 may include a single shelf antenna 200 that may be routed and tuned such that only RFID tags 250 within a defined portion 162 of the outer boundary 160 respond to an interrogation signal 202 from the single shelf antenna 200. The defined portion 162 of the outer boundary 160 may occupy a volume smaller than the total volume enclosed by the outer boundary 160, which may advantageously reduce signal strength requirements for the interrogation signal 202 and the response signals 252, relative to the signal strength requirements for a shelf antenna 200 configured to activate and receive response signals 252 from RFID tags 250 located at any location within the outer boundary 160, including at the extremities or perimeter of the outer boundary 160.

In another example (FIG. 18) described in greater detail below, at least one of the shelving units 116 may include two or more shelf antennas 200. For example, a shelving unit 116 may include a first shelf antenna 206 and a second shelf antenna 208 arranged in laterally spaced, side-by-side relation to one another. The first shelf antenna 206 is routed and tuned such that only RFID tags 250 located within a first defined portion 164 of the outer boundary 160 respond to an interrogation signal 202 from the first shelf antenna 206. The second shelf antenna 208 is routed and tuned such that only RFID tags 250 located within a second defined portion 166 of the outer boundary 160 respond to an interrogation signal 202 from the second shelf antenna 208. The first defined portion 164 is non-overlapping with the second defined portion 166.

Although not shown, the present disclosure further contemplates a shelving unit 116 having three or more shelf antennas 200, each being routed and tuned such that only RFID tags 250 within a respective first defined portion, second defined portion, and third defined portion respond to the interrogation signals 202 respectively radiated by the first shelf antenna, second shelf antenna, and third shelf antenna, and wherein the first defined portion, second defined portion, and third defined portion are non-overlapping. As may be appreciated, a shelving unit 116 may include any number of shelf antennas 200 each configured to radiate an interrogation signal 202 activating RFID tags 250 within a defined portion 162 that is non-overlapping with one or more other defined portions 162 respectively associated with other shelf antennas 200 located within the same outer boundary 160.

The routing and tuning of the shelf antennas 200 (e.g., leaky coaxial cables 210) may be performed prior to initial start-up of the inventory management system 100, or at anytime when the inventory management system 100 is up and running. For example, for an inventory management system 100 installed in a refrigerated area (e.g., a −10 degree F. freezer), prior to powering up the freezer, the inventory management system 100 is initially configured by going from shelving unit 116 to shelving unit 116 and manually adjusting the routing of the leaky coaxial cable 210 including the vertical position of the shelf antenna 200 within the shelving unit 116, and the shape (e.g., an open loop shape 230) and overall dimensions (e.g. overall length and overall width) of the leaky coaxial cable 210 when viewed from a top-down perspective as a means to adjust the radiation pattern and shape. In addition, the leaky coaxial cable 210 shelf antenna 200 in each shelving unit 116 may be tuned by adjusting the power level of the RFID reader 126 as a means to adjust the leakage or gain of the leaky coaxial cable 210. Each leaky coaxial cable 210 may be routed and tuned until the shape, range, and transmit power (e.g., the RSSI—received signal strength indicator) of the interrogation signal 202 results in the defined portion(s) of each shelving unit 116 enveloping or encompassing the locations of the RFID tags 250 in the shelving unit 116, and which may include pallet tags 256, material tags 258, and system health tags 260. For shelving units 116 containing two or more shelf antennas 200 (e.g., FIGS. 1, 18, and 19), the shelf antennas 200 in the same shelving unit 116 are routed and tuned such that the defined portions 162 associated with the two or more shelf antennas 200 are non-overlapping, as described below. During the initial routing and tuning of the one or more shelf antennas 200 in a shelving unit 116, the shelf antenna power may be initially adjusted to a high level, and then gradually reduced to a level that allows the interrogation signal 202 for each shelf antenna 200 to activate at least one RFID tag 250 intended to be activated by the shelf antenna 200.

The inventory management system 100 advantageously includes an auto-tune capability wherein the power level of the interrogation signal 202 of any one or more of the shelf antennas 200 in the shelf system 108 is autonomously (e.g., without manual input) adjusted. In this regard, during normal operation of the inventory management system 100, as interrogation signals 202 are being radiated by the different shelf antennas 200, the RFID readers 126 receive response signals 252 from the RFID tags 250 via the shelf antennas 200. One or more of the RFID readers 126, via control by a system controller 130, automatically increase or decrease the power level of an interrogation signal 202 if the strength of the interrogation signal and/or one or more of response signals 252 is outside of a predetermined signal strength range. In this regard, the shelf antenna power may be adjusted to a level just enough to activate the RFID tags 250 in a defined portion 162 of the outer boundary 160. If the received signal strength indicator (RSSI) at an RFID reader 126 shows strong reception, the RFID reader 126 automatically decreases the power level of the interrogation signal 202 because excessive signal power from one shelf antenna 200 may cause interference with interrogation signals 202 or response signals 252 associated with other shelf antennas 200.

If the RSSI is not sufficient and the system controller 130 indicates a weak signal, the RFID reader 126 automatically increases the strength of the interrogation signal 202. The predetermined signal strength of the RSSI may be determined through testing of different configurations and/or quantities of tracked items 270 within a shelving unit 116. For example, the signal strength range may be determined through testing of a shelving unit 116 configuration having a single layer of material containers 276 supported on a pallet 272. Another shelving unit 116 configuration that may be tested to determine optimal predetermined signal strength includes multiple layers of material containers 276, each having RFID tags 250, and which may therefore require a boost in the strength of the interrogation signal 202 so that the RFID tags 250 on the bottom layer of the stack of containers 276 can be activated and can generate a response signal 252 that can be received by the shelf antenna 200. The auto-tuning capability advantageously avoids the need for a technician to go into a harsh environment (e.g., a freezer at −10 degrees F.) and make manual adjustments to the shelf antenna 200, the RFID reader 126, or other components associated with a shelving unit 116.

Referring still to FIG. 1, at least one of the shelf antennas 200 is a leaky coaxial cable 210 configured to emit interrogation signals 202 and receive response signals 252. Advantageously, a leaky coaxial cable 210 provides for a cost-effective, conformable antenna that can readily be initially configured and re-configured into any one of a variety of two-dimensional shapes (e.g., FIGS. 10 and 19) or three-dimensional shapes (not shown) for radiating interrogation signals 202 in a specific size and pattern. For example, in the present-disclosed inventory control system, a leaky coaxial cable 210 may be provided in an orthogonal (e.g., rectangular or square) open loop shape 230 when viewed from a top-down perspective. As described in greater detail below and illustrated in FIG. 7, an orthogonal open loop shape 230 of the leaky coaxial cable 210 results in the overall pattern of the interrogation signal 202 having a generally orthogonal shape when viewed from a top-down perspective, and which is complementary to the orthogonal shape of a shelving unit 116 and/or complementary to the shape of the tracked items 270 to be stored in the shelving unit 116. As may be appreciated, the leaky coaxial cable 210 may be arranged in any one of a variety of shapes other than in an open loop shape 230. For example, although not shown, a leaky coaxial cable 210 when viewed from a top-down perspective may be arranged in a straight line, in a sine-wave shape, a circular open loop shape, or in any one of a variety of other two-dimensional or three-dimensional shapes.

In the presently-disclosed examples, each shelf antenna 200 is configured to both radiate RFID signals (e.g., interrogation signals 202) and receive RFID signals (e.g., response signals 252) from activated RFID tags 250. However, in other examples not shown, one or more of the shelving units 116 may include a shelf antenna 200 (e.g., a leaky coaxial cable) dedicated to radiating interrogation signals 202, and the same shelving unit 116 may include another shelf antenna (e.g., another leaky coaxial cable) dedicated to receiving response signals 252 emitted by RFID tags 250 activated by the interrogation signal 202 from the other shelf antenna 200.

The inventory management system 100 may be configured such that the plurality of shelf antennas 200 of a shelf system 108 radiate interrogation signals 202 simultaneously and/or on a continuous basis (e.g., every 1 second). However, in other examples, the shelf antennas 200 may radiate interrogation signals 202 on a periodic basis (e.g., every hour), or at preprogrammed times during the day. In still other examples, the shelf antennas 200 may be manually prompted to radiate interrogation signals 202 such as whenever it is necessary to retrieve a tracked item 270 from the shelf system 108.

In the presently-disclosed examples, the RFID tags 250 may be provided as passive tags due to their lower cost and thinner profile relative to active tags which may have a higher cost and thicker profile due to the requirement of a battery in active tags. In addition, passive tags may be less likely than active tags to emit response signals that interfere with other response signals. However, the present disclosure contemplates that one or more of the RFID tags 250 are active tags.

As indicated above, when an RFID tag 250 receives an interrogation signal 202, the RFID tag 250 emits a response signal 252. Each response signal 252 is encoded with a tag identifier assigned to the RFID tag 250. The shelf antenna 200 receives the response signal 252 which is then transmitted to the RFID reader 126. The RFID reader 126 decodes the response signal 252 to recover the tag identifier. A system controller 130 may be connected to the RFID reader 126 and may query a look-up table in an internal or external database 132 (FIG. 3) to identify the tracked item 270 carrying the RFID tag 250 that emitted the response signal 252. The database 132 may contain information about each tracked item 270. In the example where the tracked items 270 are perishable composite materials such as material rolls of composite prepreg, the database 132 may contain information about each material roll 274 such as material type, manufacturer, remaining shelf life, total out-time to date, and other information.

In addition to decoding the response signal 252 to recover the tag identifier, the system controller 130 determines the location of the shelving unit 116 containing the RFID tag 250 by querying a table in the database 132 correlating each one of the shelf antennas 200 in the shelf system 108 to a specific shelving unit 116. In this manner, the system controller 130 identifies the shelving unit 116 containing a tracked item 270 from among a plurality of shelving units 116 of the shelf system 108. For a shelving unit 116 that has more than one shelf antenna 200, the database 132 correlates each shelf antenna 200 to a specific area of the shelving unit 116. For example, for a shelving unit 116 having a first shelf antenna 206 and a second shelf antenna 208 (e.g., FIGS. 1, 3, 6, 7, and 18-19), the database 132 may correlate the first shelf antenna 206 to the left-hand portion of the shelving unit 116, and may correlate the second shelf antenna 208 to the right-hand portion of the same shelving unit 116. In this manner, the system controller 130 identifies the specific area of a specific shelving unit 116 containing a tracked item 270.

Referring still to FIG. 1, the inventory management system 100 may further include an indicator light 118 associated with each one of the shelving units 116. Each indicator light 118 is in communication with the system controller 130. As described in greater detail below, a search of the database 132 may be performed to locate a tracked item 270 by entering one or more parameters such as material type. During the search, the system controller 130 may be either manually prompted or pre-programmed to locate tracked items 270 having the shortest remaining shelf life, and/or locate tracked items 270 that are the shortest distance between the shelving unit 116 and an entrance 104 and/or an exit 106 of the storage area 102 where the shelf system 108 is located. As may be appreciated, the search options may include any one or more of a variety of search parameters for locating a tracked item 270.

Upon selecting a tracked item 270 from the search results 142 for retrieval from the shelf system 108, the system controller 130 may command the indicator light 118 to illuminate as a means to indicate the location of the shelving unit 116 containing the tracked item 270 to be retrieved. As described in greater detail below, the illumination of an indicator light 118 may aid a material handler such as a forklift operator in locating a specific shelving unit 116 from among the plurality of shelving units 116 that make up a shelf system 108. In addition, as described below, the system controller 130 may be communicatively and/or wirelessly coupled to a display device 134 (e.g., a portable wireless device 136 or a tablet). The display device 134 may be configured to display an electronic map 144 visually indicating to a user (e.g., a material handler such as a forklift operator) the location of the shelving unit 116 containing the tracked item 270. Additionally, upon receiving new tracked items 270 to be stored in the shelf system 108, the system controller 130 may command the indicator light 118 to illuminate as a means to indicate the location of the shelving unit 116 into which the tracked items 270 are to be placed. For example, a search of the database 132 may be performed to locate shelving units 270 containing material rolls 274 that are of the same type as an order of material rolls recently received from a vendor. Alternatively or additionally, the system controller 130 may provide the capability for grouping and segregation of tracked items 270 (e.g., material rolls) within a storage area 102 such as a freezer. For example, materials may be grouped by production program, by company division, by material grief areas (e.g., material shortages, additional attention, extra handling requirements, etc.), and/or by freezer storage restrictions (e.g., shelving units obstructions/limitations, storage height restrictions, pallet size limitations, etc.).

As a further aid in locating a shelving unit 116, the inventory management system 100 may include a device antenna 135 (FIG. 4) operably connected to the portable wireless device 136 by a device RFID reader 137. In one example, the device antenna 135 may be mounted to a material handling device 121 such as a forklift 122. As described in greater detail below, the device antenna 135 may radiate an interrogation signal 202 (FIG. 4) generated by the device RFID reader 137, such as when the forklift 122 nears the location of the shelving unit 116 designated on the electronic map 144. The device antenna 135 may receive response signals 252 emitted by RFID tags 250. The portable wireless device 136 may compare the response signals 252 emitted by RFID tags 250 activated by the interrogation signal 202 from the device antenna 135 with the response signals 252 emitted by RFID tags 250 activated by the interrogation signal 202 from one of the shelf antennas 200, and may generate an indication such as a flashing light on the display of the portable display device when the response signals 252 emitted by RFID tags 250 activated by the interrogation signal 202 from the device antenna 135 match the response signals 252 emitted by RFID tags 250 activated by the interrogation signal 202 from the shelf antennas 200 containing, thereby confirming to a material handler that the shelving unit 116 is the same shelving unit 116 identified in a database search as containing a specific tracked item 270.

As described in greater detail below, the system controller 130 may also be configured to cause an indicator light 118 of a shelving unit 116 to illuminate upon the detection of an anomaly and/or malfunction with one or more of the shelf antennas 200, the RFID reader 126, and/or other system components assigned to the shelving unit 116. An anomaly or malfunction of a shelf antenna 200 may include a low signal strength of the interrogation signal 202 radiated by the shelf antenna 200 or a non-existent interrogation signal 202. Low signal strength of the interrogation signal 202 may be determined with the aid of one or more system health tags 260 (e.g., RFID tags 250) that may optionally be located within each shelving unit 116. If a system health tag 260 in one of the shelving units 116 fails to emit a response signal 252, the system controller 130 may also cause the indicator light 118 of the shelving unit 116 to illuminate to indicate an anomaly associated with the shelf antenna 200 and/or the RFID reader 126. If the system health tag 260 in one of the shelving units 116 emits a response signal 252 but the power level of the response signal 252 is below a threshold power level, the system controller 130 may cause the indicator light 118 of the shelving unit 116 to illuminate. In addition, the location of the shelving unit 116 containing the malfunctioning shelf antenna 200 may be indicated (e.g., highlighted) on an electronic map 144 displayed on a display device 134 in a manner similar the highlighted shelving unit 116 shown in FIG. 5.

Figure 2:
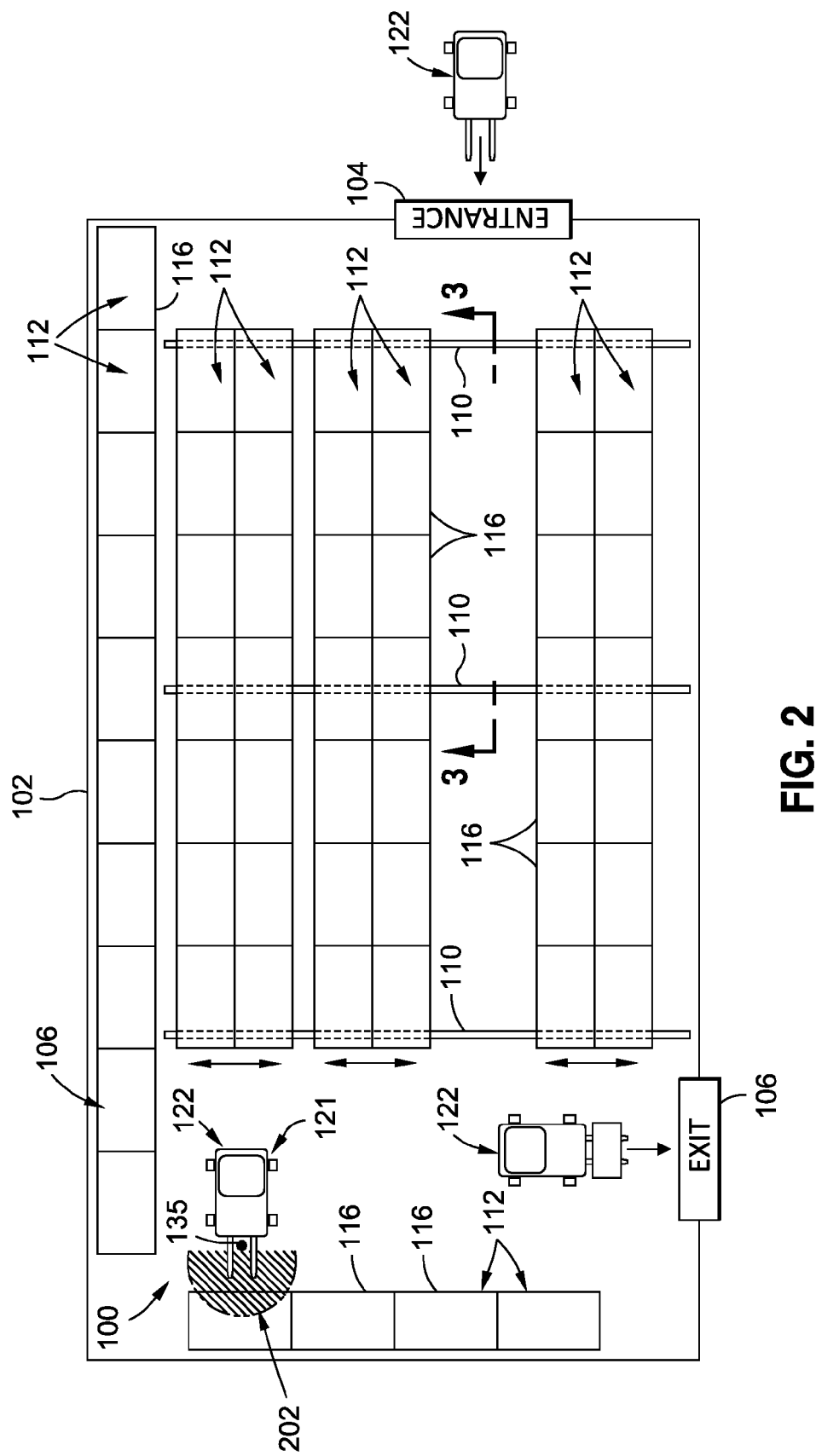
FIG. 2 is a plan view of an example of a shelf system installed within a refrigerated area (e.g., a freezer) having a plurality of storage racks each including a plurality of shelving units and incorporating the inventory management system disclosed herein.
Figure 10:
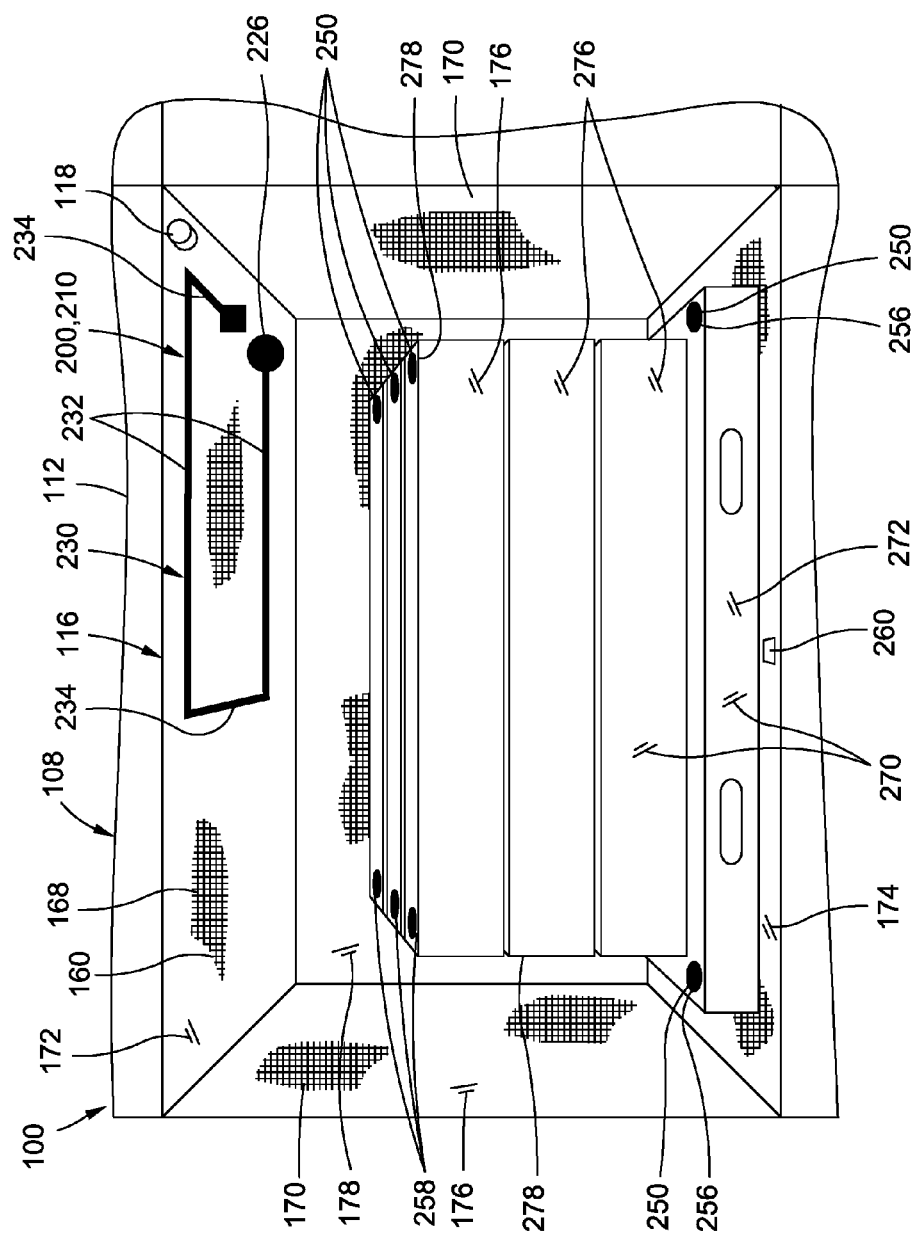
FIG. 10 is a fisheye perspective view of an example of a shelving unit having an outer boundary defined by RF blocking material and containing a single shelf antenna for activating one or more RFID tags.

Referring to FIG. 2, shown is a plan view of an example of a shelf system 108 installed within a storage area 102 configured as a large-capacity refrigerated area (e.g., a freezer). The refrigerated area may be implemented for storing perishable items such as composite materials. For example, the composite material may comprise rolls of prepreg packaged in individual containers 276 (FIG. 10). However, the composite material is not limited to prepreg, and may include any type of thermoplastic or thermosetting composite material including prepreg, resin (e.g., epoxy resin) in a liquid state or in a solid film state, adhesives, and any other type of composite material, without limitation.

A storage area 102 may be enclosed and may therefore include one or more entrances 104 and may further include one or more exits 106. An entrance 104 and an exit 106 may each include an antenna and an RFID reader which may be wirelessly or hardwire connected to the system controller 130 (FIG. 1). In this manner, the system controller 130 may record the movement of each tracked item 270 (e.g., material roll) into an out of the storage area 102 as a means for tracking the out-time of each tracked item 270. In addition, when a tracked item 270 passes the exit 106 or moves out of the storage area 102, a message may be sent to the system controller 130 to disassociate the tracked item 270 from the current inventory (e.g., in the database) of the storage area 102. When a tracked item 270 passes the entrance 104 or moves into the storage area 102, a message may be sent to the system controller 130 to associate (e.g., add) the tracked item 270 to the current inventory in the database 132.

Although the presently-disclosed inventory management system 100 is described in the context of a shelf system 108 located in an enclosed storage area 102, the inventory management system 100 may also be implemented in a shelf system 108 located in a non-enclosed storage area (not shown) or an open storage area (not shown). Such a non-enclosed or open storage area may include one or more perimeter locations designated for entering and/or exiting the storage area. Each designated perimeter location for entering and/or exiting a storage area may have a dedicated RFID reader and antenna coupled to the system controller 130 for tracking the movement of tracked items 270 into an out of the non-enclosed or open storage area, similar to the above-described arrangement for the enclosed storage area 102.

In FIG. 2, the shelf system 108 has a plurality of storage racks 112 each including a plurality of shelving units 116 and incorporating an inventory management system 100 as disclosed herein. One or more of the storage racks 112 within a storage area 102 may be fixed or non-movable relative to the floor of the storage area 102. For example, FIG. 2 illustrates a row of 10 storage racks 112 positioned in side-by-side relation to one another, and fixed in position against a wall of the refrigerated area, as is shown along the top of the illustration of FIG. 2. The wall on the left-hand side of FIG. 2 has a row of four (4) storage racks 112 positioned in side-by-side relation to one another, and which are fixed in position adjacent to the wall.

Also shown in FIG. 2 are three (3) sets of back-to-back rows of storage racks 112. Each one of the back-to-back rows of storage racks 112 is individually laterally movable along rails 110 mounted to or integrated with the floor structure. The laterally movable back-to-back rows of storage racks 112 provide high density storage capacity, while allowing the back-to-back rows of storage racks 112 to be laterally moved in a manner to selectively create an aisle way (e.g., for a forklift 122) between any two adjacent rows in a manner such that the open sides 180 of the shelving units 116 are accessible for retrieving and/or replacing tracked items 270.

For shelf systems 108 having laterally movable storage racks 112, the presently-disclosed inventory management system 100 prevents erroneous reading of RFID tags 250 in shelving units 116 located in different rows that are in close proximity to one another and have open sides 180 that face one another. For example, in FIG. 2, the top two (2) rows of storage racks 112 are shown positioned in laterally close proximity to one another such that the open sides 180 of the shelving units 116 in one row of storage racks 112 face the open sides 180 of the shelving units 116 in the other row of storage racks 112. In such a scenario, when the system controller 130 causes interrogation signals 202 in the shelf system 108 to be radiated as part of the normal operation on the inventory management system 100, the system controller 130 may prevent the RFID readers 126 and shelf antennas 200 in the rows of facing storage racks 112 from radiating an interrogation signal 202 when the facing storage racks 112 are within a predetermined activation distance of one another. The activation distance between facing rows of storage racks 112 may be monitored by a rack position sensor (not shown) that may be included with one or both rows of facing storage racks 112 or the rack position sensor may be integrated into the rails 110 along which the storage racks 112 may move. Although not shown, the activation distance may be described as the distance between facing storage racks 112 that would result in the interrogation signal 202 from the shelving units 116 in one row of storage racks 112 activating the RFID tags 250 in the facing row of storage racks 112, and which would result in erroneous recordings of the locations of tracked items 270. Instead, for facing storage racks 112 that are within the activation distance, the system controller 130 may command the RFID readers to avoid radiating interrogation signals 202 from the shelf antennas 200 in the facing storage racks, and use the data recorded during the most recent interrogation period when the facing storage racks 112 were spaced further apart than the activation distance.

FIG. 3 is a side view of an example of a row of storage racks 112 having a plurality of shelving units 116. Each shelving unit 116 includes at least one shelf antenna 200 routed and tuned to radiate an interrogation signal 202 in a manner activating one or more RFID tags 250 mounted on one or more tracked items 270 stored in the shelving unit 116. Each one of the side-by-side storage racks 112 is made up of vertically stacked tiers 114 of shelving units 116. In the example shown, each storage rack 112 include four (4) tiers 114 of shelving units 116. However, a storage rack 112 may include any number of tiers 114 of shelving units 116. Although the figures show each one of the shelving units 116 as having the same size and shape and storing tracked items 270 that are also the same size and shape as one another, it is contemplated that a shelf system 108 may include shelving units 116 of different sizes and/or shapes, and configured to store tracked items 270 of different sizes and/or shapes. In this regard, the one or more shelf antennas 200 in each shelving unit 116 may be routed and tuned according to the size (e.g., length, width, and/or height) and shape of the shelving unit 116 and/or according to the location of the RFID tags 250 on the tracked items 270 stored in the shelving unit 116. For example, although FIG. 3 illustrates similarly-sized composite material roll containers 276 stacked on top of one another on similarly-sized pallets 272, any one or more of the shelving units 116 may store tracked items 270 of any type, quantity, size, shape, and configuration, without limitation.

In this regard, the leaky coaxial cable 210 can be purchased in bulk (e.g., on reels containing 100's of feet of cable) and then cut to length based on the required size and shape of the leaky coaxial cable 210 within each individual shelving unit 116. Male and female connectors (not shown) may be respectively applied to the mating cable terminations 226 (FIG. 11) of the leaky coaxial cable 210 and the non-radiating cable 228 to quickly and easily customize the shelf antenna 200 installation in each shelving unit 116. As mentioned below, leaky coaxial cable 210 can be supported on a shelving unit 116 using movable antenna mounting brackets 204 (e.g., see FIGS. 12 and 15) allowing the leaky coaxial cable 210 to be readily configured and re-configured into any one of a variety of shapes (e.g., FIGS. 10 and 19) or three-dimensional shapes complementary to the size and shape of each shelving unit 116, and complementary to the intended size, shape, and intended orientation of the tracked items to be stored in the shelving unit 116, which affects the location of the RFID tags 250 and the required radiation pattern of the interrogation signal 202 radiated by the leaky coaxial cable 210 in each shelving unit 116.

Referring still to FIG. 3, each shelving unit 116 includes at least one shelf antenna 200 provided as a radiating coaxial cable 210 and connected by a non-radiating coaxial cable 228 to a multiplexing device 124. Each multiplexing device 124 may be connected by the non-radiating cable 228 to an RFID reader 126. The non-radiating cable 228 may be a low-loss coaxial cable allowing for interconnection of the shelf antennas, the multiplexing devices, and the RFID readers at extended distances between such components. In this regard, the non-radiating coaxial cable maximizes the limited RF budget of the inventory management system 100.

Each one of the RFID readers 126 is connected to the system controller 130. As indicated above, the system controller 130 may include a database 132 which may be internal or external to the system controller 130. The system controller 130 may be external to or integrated into a display device 134 such as a computer workstation, a laptop, a wireless computing device, or another type of device. In the example shown, each multiplexing device 124 connects four (4) shelf antennas 200 to an RFID reader 126. However, any number of shelf antennas 200 (e.g., up to 8 or more shelf antennas 200) may be connected to a single multiplexing device 124 depending upon the number of ports provided at a hub of the multiplexing device 124. Shelf antennas 200 from the same or different storage racks 112 may be coupled to the same multiplexing device 124. Each one of the multiplexing devices 124 is connected to an RFID reader 126 as indicated above. Although FIG. 3 illustrates two (2) multiplexing devices 124 connected to each RFID reader 126, any number of multiplexing devices 124 may be connected to an RFID reader 126 depending upon the number of connection ports provided with the RFID reader 126 and/or depending upon the amount of data that each RFID reader 126 can process at one time.

FIG. 3 also illustrates an indicator light 118 associated with each one of the shelving units 116. As indicated above, the system controller 130 may be configured to illuminate an indicator light 118 to indicate the location of the shelving unit 116 containing a tracked item 270 to be retrieved or to indicate the location of the shelving unit 116 into which a previously-removed tracked item 270 is to be replaced. As indicated above, the elimination of the indicator light 118 may aid a material handler such as a forklift operator in locating the specific shelving unit 116 from among the plurality of shelving units 116 of the shelf system 108. The system controller 130 may be capable of wireless communication with a portable wireless device 136 or tablet that may be mounted on the forklift 122.

FIG. 4 shows a portable wireless device 136 mounted to a forklift 122 to assist the forklift operator in locating a shelving unit 116 within the storage area 102. The display device 134 such as the portable wireless device 136 may be configured to display an electronic map 144 visually indicating the location of the shelving unit 116 for retrieving or replacing a tracked item 270. Additionally or alternatively, the inventory management system 100 may include one or more portable wireless device(s) 136 that may be carried by a material handler walking into a storage area 102 and manually retrieving a tracked item 270 from a shelving unit 116. Such portable wireless devices 136 may display an electronic map 144 identifying the location of the shelving unit 116. Inside the storage area, the indicator light 118 mounted to the shelving unit 116 may be aid the material handler in locating the shelving unit 116.

As mentioned above, a material handling device 121 such as a forklift 122 or a self-propelled pallet jack (not shown) may include a device antenna 135. In the example of a forklift 122 in FIG. 4, a device antenna 135 may be mounted on a forward portion of the forklift 122 such as on the forklift mast to which the forks are vertically-movably attached, or on a roll cage of the forklift 122. The device antenna 135 may be operably connected via non-radiating cable 228 to a device RFID reader 137 which may also be mounted on the forklift 122. The device RFID reader 137 may be operably connected to the portable wireless device 136. As mentioned above, the device antenna 135 may radiate an interrogation signal 202 generated by the device RFID reader 137. In one example, the device antenna 135 may radiate an interrogation signal 202 upon command by a material handler such as by manipulating a user interface of the portable wireless device 136. In other examples, the device antenna 135 may radiate an interrogation signal 202 on a continuous basis or on a periodic basis. In still other examples, the device antenna 135 may radiate an interrogation signal 202 only when the device antenna 135 is inside the storage area 102 such as when the forklift 122 (FIG. 4) nears the location of the shelving unit 116 designated on the electronic map 144. The device antenna 135 may radiate an interrogation signal 202 when the device antenna 135 is in close proximity to the shelving unit 116 containing the tracked item 270 resulting from a search of the inventory database 132.

The device antenna 135 may also be configured to receive response signals 252 emitted by RFID tags 250 similar to the manner in which the shelf antennas 200 both radiate interrogation signals 202 and receive response signals 252. The portable wireless device 136 and/or the system controller 130 may compare the identification codes of the response signals 252 emitted by RFID tags 250 activated by the interrogation signal 202 from the device antenna 135 with the identification codes of the response signals 252 emitted by RFID tags 250 activated by the interrogation signal 202 from one of the shelf antennas 200, such as the shelf antenna 200 in the shelving unit 116 designated as containing the tracked item 270 resulting from a search of the inventory database 132. When the response signals 252 emitted by RFID tags 250 activated by the interrogation signal 202 from the device antenna 135 match the response signals 252 emitted by RFID tags 250 activated by the interrogation signal 202 from one of the shelf antennas 200, the portable wireless device 136 may generate an indication of such match. For example, the portable wireless device 136 may generate a visual indication (e.g., an illuminated light) and/or an audible indication (e.g., a ringing bell) of such match. A visual indication of a match may include a notification of the match on the electronic map 144 displayed on the portable wireless device 136. For example, the portable wireless device 136 may illuminate a red light to indicate a non-match, and may illuminate a green light or a flashing light to indicate a positive match. Regardless of the manner of indication of the match, providing a device antenna 135 on the material handling device 121 (e.g., a forklift 122) may allow the material handler (e.g., forklift operator) to verify that the shelving unit 116 is the same shelving unit 116 identified in the database 132 as containing the tracked item 270 (e.g., a specific material roll) that was the subject of the search.

Figure 5:
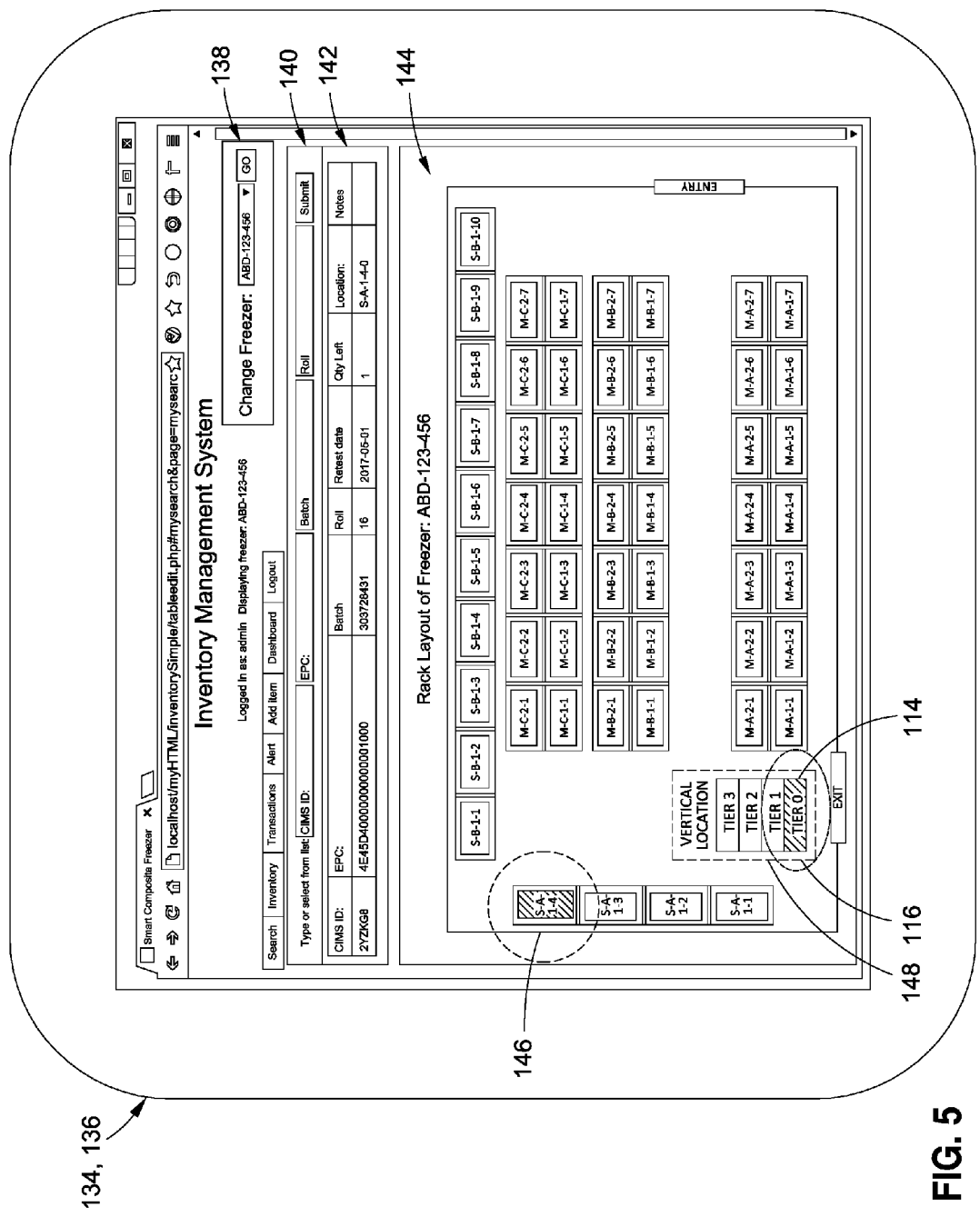
FIG. 5 is an example of the display of the portable wireless device of FIG. 4 and illustrating a user interface configured to allow a user to perform a search of a database for a tracked item stored within the shelf system and further illustrating an electronic map with crosshatching highlighting the location of the shelving unit containing the results of the database search.

FIG. 5 is an example of a user interface that may be displayed on a display device 134 such as the forklift-mounted portable wireless device 136 of FIG. 4. The user interface may include a search menu allowing a material handler to search for a material stored in a shelf system 108 of a selected storage area 102. The search menu may include several search options including, but not limited to, storage area selection 138 and material search options 140. Storage area selection 138 (e.g., "Change Freezer") may include a drop-down menu allowing user to select a storage area 102 from among a plurality of storage area locations. The material search options 140 feature may allow a user to enter or select from a drop-down menu one or more material parameters. For example, a user may enter or select the identification number (e.g., CIMS ID) of the material, the batch number, the roll number, the retest date (e.g., related to shelf life), the quantity of material remaining, and the location of a material. The user interface may allow editing of a material parameter by double-clicking on the parameter and editing the data. After editing, the revised data may be automatically synchronized with the database 132 accessible via the system controller 130 and/or a server (not shown) to which the system controller 130 may be connected.

The user interface may include an "Inventory" menu which, when selected, may display on the user interface a listing (not shown) of all tracked items 270 currently stored in the selected storage area 102. The inventory listing may include any one or more of the above-mentioned material parameters including, but not limited to, the retest date and the location of each tracked item 270. Clicking on the header of each material parameter allows for sorting of the information. For example, clicking on the "Retest Date" header may sort the tracked items 270 in chronological order with the oldest tracked item 270 listed first. Likewise, clicking on the "Location" header may sort the tracked items 270 in the order of distance between the shelving unit 116 containing the item and the entrance 104 or exit 106 to the storage area 102, with the shortest distance being listed first. Alternatively, the inventory management system 100 may be programmed to automatically list the oldest tracked items 270 first, or the tracked items 270 that are the shortest distance from the entrance 104 or exit 106 may be listed first.

FIG. 5 further illustrates the search results 142 that may be displayed on the user interface. The search results 142 may include any one of the above-described material parameters. In addition, the user interface may display an electronic map 144 illustrating in plan view the storage area 102 and highlighting the storage rack location 146 containing the shelving unit 116 where the tracked item 270 from the search results 142 is stored. In addition, the electronic map 144 may display a vertical location window 148 illustrating the vertically-stacked tiers 114 of shelving units 116 that make up the highlighted storage rack 112, and highlighting in the vertical location window 148 the shelving unit 116 containing the tracked item 270 matching the results of the search.

Figure 6:
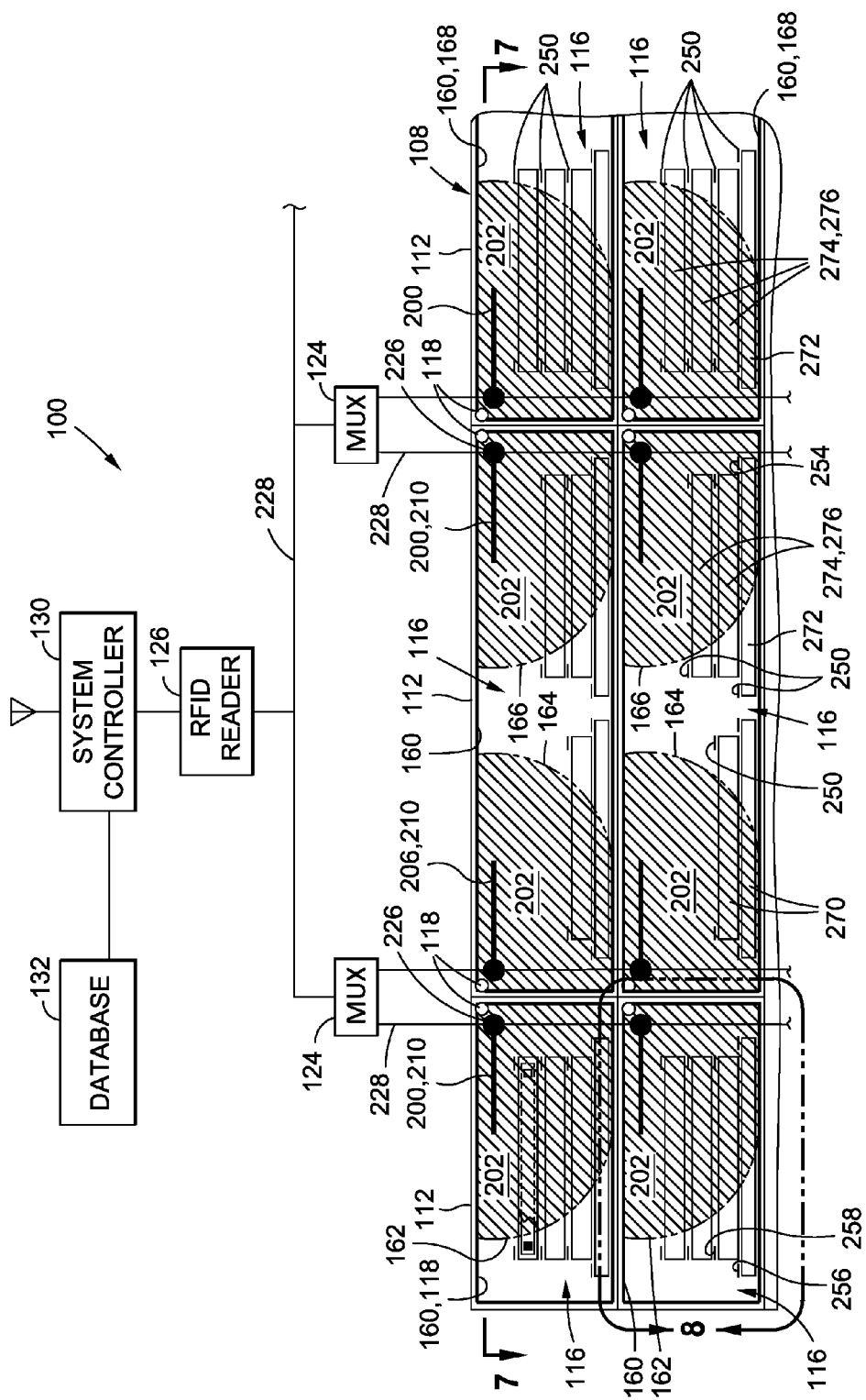
FIG. 6 is a side view of the upper two tiers of the storage rack of FIG. 3 and illustrating in crosshatch a defined portion of the outer boundary of the shelving unit within which RFID tags respond to an interrogation signal radiated by a shelf antenna associated with the shelving unit.

FIG. 6 is a side view of the upper two tiers 114 of the side-by-side storage racks 112 of FIG. 3 and illustrating in crosshatch one or more defined portions 162 in each outer boundary 160 of each shelving unit 116 within which RFID tags 250 respond to an interrogation signal 202 radiated by the shelf antenna 200 of each shelving unit 116. On the left-hand side of FIG. 6, shown are the top two (2) tiers 114 of a storage rack 112. Each shelving unit 116 contains a single shelf antenna 200 which is routed and sized to radiate an interrogation signal 202 in a manner such that only RFID tags 250 within the defined portion 162 of the outer boundary 160 of each shelving unit 116 are activated by the interrogation signal 202. In the center of FIG. 6, shown are the top two (2) tiers 114 of a storage rack 112 having shelving units 116 containing a first shelf antenna 206 and a second shelf antenna 208. As indicated above, the first shelf antenna 206 is routed and tuned such that only RFID tags 250 located within the first defined portion 164 respond to the interrogation signal 202 radiated by the first shelf antenna 206. The second shelf antenna 208 is routed and tuned such that only RFID tags 250 located within the second portion respond to the interrogation signal 202 rated by the second shelf antenna 208. The first shelf antenna 206 and second shelf antenna 208 are routed and tuned such that the first defined portion 164 and the second defined portion 166 do not overlap.

As mentioned below, the reduced size of the defined portion(s) (e.g., FIGS. 8 and 18) associated with a shelf antenna advantageously reduces the total amount of data (e.g., from response signals) that the RFID reader 126 and/or system controller 130 are required to process. In addition, RFID tags may be placed on containers 276 in a symmetrical manner to minimize or eliminate special material handing requirements and to avoid orientation sensitivity of tracked items 270 within a shelving unit 116. For example, each container 276 can have an RFID tag 250 on each one of the opposing container ends 278 to ensure that regardless of the left-right orientation of the container 276 in the shelving unit 116, one of the RFID tags 250 will always be activated by an interrogation signal 202. Furthermore, RFID tags 250 may be placed on the exterior of the containers 276 to accommodate material packing constraints. For example, placing RFID tags 250 on the exterior of a container 276 of prepreg may allow for tracking of material rolls that may include RFID tags mounted directly on the prepreg roll and/or inside the cardboard spool, but which are sealed within bags that are not RF transparent.

In FIG. 6, each one of the shelf antennas 200 is positioned adjacent to and/or mounted to a top wall 172 of the outer boundary 160 of the shelving unit 116. The top wall 172 is located opposite a bottom wall 174 of the outer boundary 160. In positioning the shelf antenna 200 adjacent the top wall 172, the shelf antenna 200 is configured for top down radiation of the interrogation signal 202. However, in other embodiments not shown, any one or more of the shelf antennas 200 in any one or more of the shelving units 116 may be positioned adjacent to or mounted adjacent to other locations within the shelving unit 116, and is not limited to being mounted to the top wall 172. For example, one or more shelf antennas 200 may be mounted to one or both of the opposing end walls 176 of the outer boundary 160 of a shelving unit 116. Alternatively, one or more of the shelf antennas 200 may be mounted to the back wall 178 of the outer boundary 160 located opposite the open side 180 of the outer boundary 160 of the shelving unit 116.

As indicated above, the RF blocking material 168 heavily attenuates or blocks the interrogation signal 202 radiated by a shelf antenna 200 and also heavily attenuates or blocks response signals 252 emitted by RFID tags 250 activated by an interrogation signal 202. In FIG. 6, each one of the shelving units 116 includes an outer boundary 160 defined at least in part by RF blocking material 168 such that interrogation signals 202 radiated by each shelf antenna 200 are prevented by the RF blocking material 168 from activating RFID tags 250 located in other shelving units 116. Likewise, response signals 252 emitted by RFID tags 250 in a defined portion 162 of an outer boundary 160 of one shelving unit 116 are prevented by the RF blocking material 168 from reaching a shelf antenna 200 associated with another defined portion 162 of the outer boundary 160 of the same shelving unit 116, and/or are prevented from reaching a shelf antenna 200 of other shelving units 116.

Figure 7:
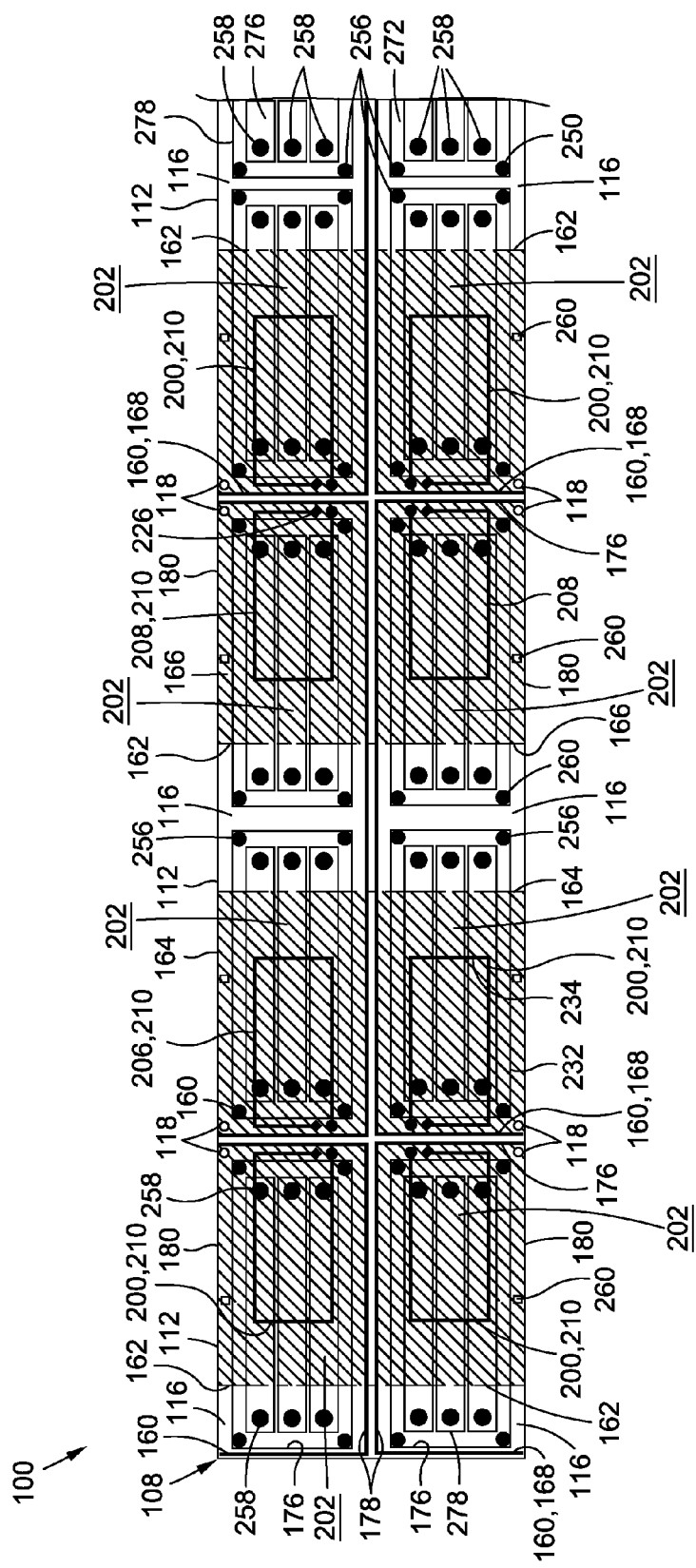
FIG. 7 is a plan view of the storage rack of FIG. 6 illustrating in crosshatch a top view of the defined portions of each outer boundary within which RFID tags respond to the interrogation signal radiated by the one or more shelf antennas assigned to the shelving unit.

FIG. 7 is a plan view of the storage rack 112 of FIG. 6 showing each shelf antenna 200 configured as a leaky coaxial cable 210 having an open loop shape 230 when viewed from a top-down perspective. The open loop shape 230 is made up of two lengthwise portions 232 interconnected by a widthwise portion 234 on one end of the open loop shape 230, and another widthwise portion 234 terminates at a cable termination 226 at an opposite end of the open loop shape 230. One of the lengthwise portions 232 terminates at a cable termination 226 which may be connected to the multiplexing device 124 by a non-radiating cable 228. In the example of FIG. 7, the widthwise portions 234 of the open loop shape 230 (i.e., the width of the open loop shape 230) may extend from a location adjacent the back wall 178 toward the open side 180 of the outer boundary 160. The lengthwise portions 232 of the open loop shape 230 (e.g., the length of the open loop shape 230) may extend from a location adjacent to an end wall 176 of the outer boundary 160 to a location short of the approximate lengthwise mid-point of the outer boundary 160 of the shelving unit 116. For example, the left-hand side of FIG. 7 illustrates back-to-back storage racks 112 each including a shelving unit 116 having a single shelf antenna 200 extending from one of the end walls 176 of the shelving unit 116 to an approximate lengthwise mid-point of the shelving unit 116.

Also shown in crosshatching in FIG. 7 are the defined portions 162 of each shelving unit 116. As mentioned above, the defined portion 162 represents the maximum range at which an interrogation signal 202 from a shelf antenna 200 is able to activate an RFID tag 250. Advantageously, by placing RFID tags 250 on opposing ends of a tracked item 270, the signal strength requirements for the interrogation signal 202 can be reduced relative to an arrangement where the RFID tags 250 are placed at random locations, and which may result in only a single RFID tag 250 being placed at a lengthwise location on a tracked item 270 that may be outside of the defined portion 162. It should be noted that although the figures illustrate tracked items 270 having RFID tags 250 mounted only on the opposing ends 278 of each container and on the pallet 272 corners, RFID tags 250 may be positioned at additional locations on a tracked item 270. For example, in addition to RFID tags 250 on each one of the opposing container ends 278, an RFID tag 250 may be placed midway between the container ends 278, and/or in other locations on a container 276. Likewise, in addition to RFID tags 250 being placed on each of the four (4) pallet 272 corners, one or more RFID tags 250 may be placed midway between any two of the pallet 272 corners, and/or in other locations on the pallet 272.

Figure 18:
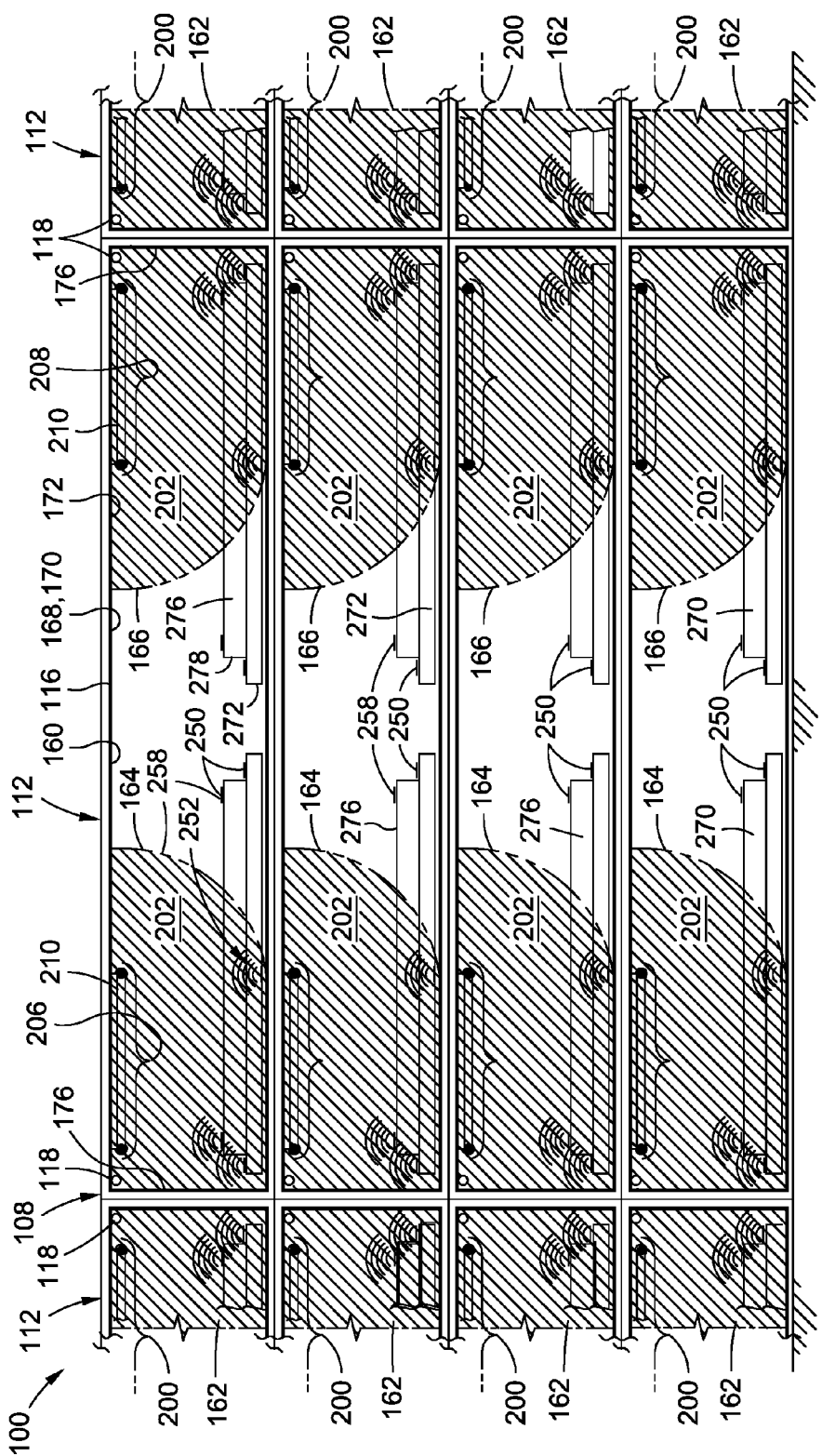
FIG. 18 is a side view of a stack of shelving units each containing a pair of side-by-side shelf antennas routed and tuned such that the interrogation signals radiated by the shelf antennas are non-overlapping.
Figure 19:
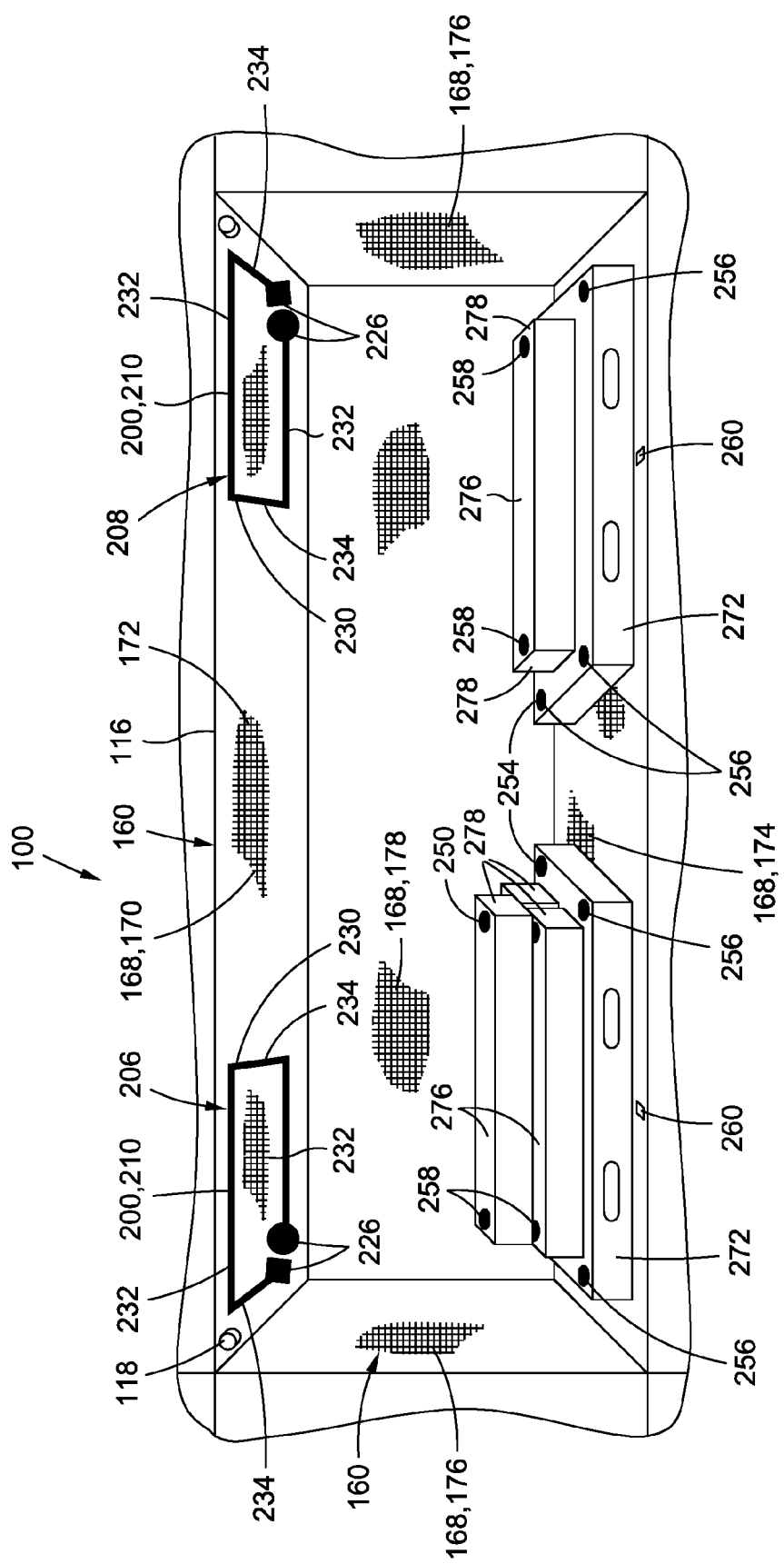
FIG. 19 is a fisheye perspective view of an example of a shelving unit containing a pair of side-by-side shelf antennas.

The center of FIG. 7 illustrates back-to-back storage racks 112 each including a shelving unit 116 having a first shelf antenna 206 and a second shelf antenna 208 arranged in laterally spaced relation to one another. Each one of the shelf antennas 206, 208 extends along a lengthwise direction from an end wall 176 to a location that is less than an approximate midpoint of the shelving unit 116. As described in greater detail below, the first shelf antenna 206 and the second shelf antenna 208 are sized and configured such that the respective interrogation signal 202 are non-overlapping with one another, allowing for the storing of tracked items 270 in side-by-side arrangement relative to one another, as shown in FIGS. 18-19 and described in greater detail below.

Figure 8:
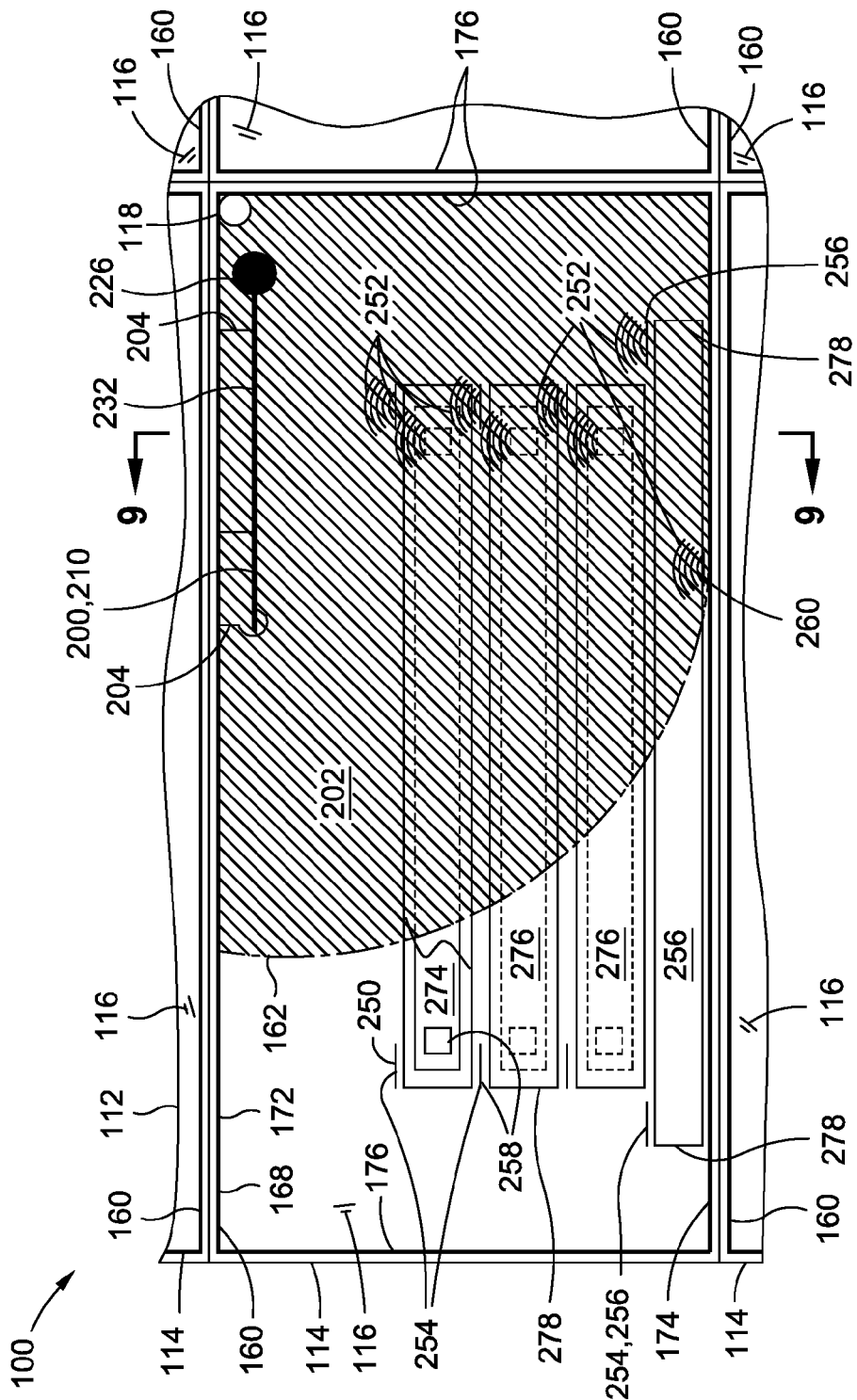
FIG. 8 is a side view of one of the shelving units of FIG. 6 containing a single shelf antenna and illustrating in crosshatch a defined portion of the outer boundary within which the interrogation signal radiated by the shelf antenna activates only the RFID tags located within the defined portion.

FIG. 8 is a side view of one of the shelving units 116 of FIG. 6. The shelving unit 116 has an outer boundary 160 defined at least in part by RF blocking material 168 for blocking interrogation signals 202 and response signals 252. In the example shown, the RF blocking material 168 defines a top wall 172, a bottom wall 174, opposing end walls 176, and a back wall 178 of the shelving unit 116. An open side 180 of the shelving unit 116 allows for movement of tracked items 270 into and out of the shelving unit 116. Although FIG. 8 illustrates each shelving unit 116 having a dedicated top wall 172, bottom wall 174, back wall 178, and opposing end walls 176, a pair of adjacently positioned shelving units 116 may share a wall formed of RF blocking material 168. FIG. 8 also illustrates in crosshatch the defined portion 162 of the outer boundary 160 within which the interrogation signal 202 radiated by the shelf antenna 200 activates only the RFID tags 250 located within the defined portion 162, causing only the RFID tags 250 within the defined portion 162 to emit a response signal 252, while the RFID tags 250 located outside of the defined portion 162 are non-activated, and therefore do not emit response signals 252 from the interrogation signal 202 radiated by the shelf antenna 200 of the same shelving unit 116.

As mentioned above, each shelf antenna 200 may be provided as a leaky coaxial cable 210 having an open loop shape 230 as illustrated in FIGS. 6-7. The leaky coaxial cable 210 may be configured to radiate the interrogation signal 202 omni-directionally (e.g., 360 degrees when viewed in cross-section—see FIG. 14), and resulting in the radiused shape (FIG. 8) of the defined portion 162 when viewed from the side. It should be noted that in the present disclosure, the shape of a defined portion 162 represents the maximum range where the interrogation signal 202 strength is capable of activating an RFID tag 250, and is not representative of the actual range of the interrogation signal 202, which generally decays in intensity with the square of the distance from the shelf antenna 200.

Also shown in FIG. 8 are a plurality of item tags 254 (e.g., RFID tags 250) mounted on the tracked items 270. For example, a tracked item 270 may include a pallet 272, each of which may include a pallet tag 256 (e.g., an RFID tag) mounted at each of the four (4) corners of the pallet 272 as shown in FIG. 7. In addition, the tracked items 270 may include one or more material tags 258 mounted on material containers that may be stacked on top of a pallet 272, or the pallet 272 may be omitted, and the tracked items 270 may be placed directly on the bottom wall 174 of the shelving unit 116. In one example, the material tags 258 may include container 276 tags (e.g., RFID tags 250) which may be placed (e.g., bonded) on boxes or containers 276, each of which may contain a roll of composite material such as roll of prepreg. In another example, spool tags (e.g., RFID tags 250) may be mounted to the inside of the cardboard spool around which the prepreg material is wound. The spool tags may provide redundancy for the container 276 tags mounted on the exterior of the container 276.

In addition to item tags 254 placed on the tracked items 270 stored on shelving units 116, the inventory management system 100 may include one or more system health tags 260 (FIG. 6) which may be mounted directly on one or more of the shelving units 116. For example, FIG. 6 illustrates system health tags 260 mounted directly on the bottom wall 174 of the shelving unit 116 to allow for system health monitoring of the shelf antennas 200 and/or the RFID reader 126 assigned to the shelving unit 116. As mentioned above, the system health tags 260 of a shelving unit 116 may emit a health signal when activated by an interrogation signal 202 from the shelf antenna 200 of the same shelving unit 116. In an embodiment, the system controller 130 may compare a power level of the health signal to a threshold power level. If the power level of the health signal is below the threshold power level or if the system health tag 260 of a shelving unit 116 fails to emit a health signal, the system controller 130 may cause the indicator light 118 of the corresponding shelving unit 116 to illuminate, indicating a potential anomaly with the shelf antenna 200 and/or the RFID reader 126 of the shelving unit 116. Additionally or alternatively, the system controller 130 may cause an electronic map 144 of the shelf system 108 to be displayed on a display device 134 to highlight the location of the shelving unit 116, similar to the highlighting shown in FIG. 5.

An anomaly with a shelf antenna 200 may be the result of a poor connection between the shelf antenna 200 and the multiplexing device 124 or between the multiplexing device 124 and the RFID reader 126, a malfunction of the multiplexing device 124, a malfunction of the shelf antenna 200, or a malfunction of another component associated with the shelving unit 116. A malfunction of an indicator light 118 may be detected by configuring the system controller 130 to periodically send a software signal to each indicator light 118. In the event that one or more of the indicator lights 118 is non-responsive to the software signal, the system controller 130 may cause the electronic map 144 on a display device 134 to highlight the shelving unit 116 containing the non-responsive indicator light 118 to allow maintenance personnel to locate the shelving unit and repair or replace the indicator light 118.

As mentioned above and as shown in FIG. 8, a material such as a roll of prepreg may be housed within a container 276 preferably having an RFID tag 250 mounted on each one of opposing ends 278 of the container 276 and/or on each corner of the pallet 272 (FIGS. 7-8). By locating one RFID tag 250 on each container end 278 and/or on each corner or side of the pallet 272, the defined portion 162 of the outer boundary 160 only has to be large enough to activate the RFID tags 250 on one container end 278 and/or on one corner or side of the pallet 272. In addition, by activating the RFID tag 250 on only one container end 278 and/or pallet corner or side instead activating of the RFID tags 250 on both container ends 278 or on all four (4) corners of a pallet 272, the RFID reader 126 is required to process a reduced amount of data from response signals. A further advantage of locating one RFID tag 250 on each container end 278 is that regardless of the left-right orientation of the container 276 within the shelving unit 116, one of the RFID tags 250 will always be activated by the interrogation signal 202. Furthermore, the reduced size of the defined portion 162 allows for a reduction in the overall length and/or overall width of the leaky coaxial cable 210 when viewed from a top-down perspective. In addition, the reduced size of the leaky coaxial cable 210 may translate into a reduction in the required strength of the interrogation signal 202, which may reduce power requirements for the RFID reader 126, and which may also avoid interference of the interrogation signal 202 with the signals from other shelving units 116.

Figure 9:
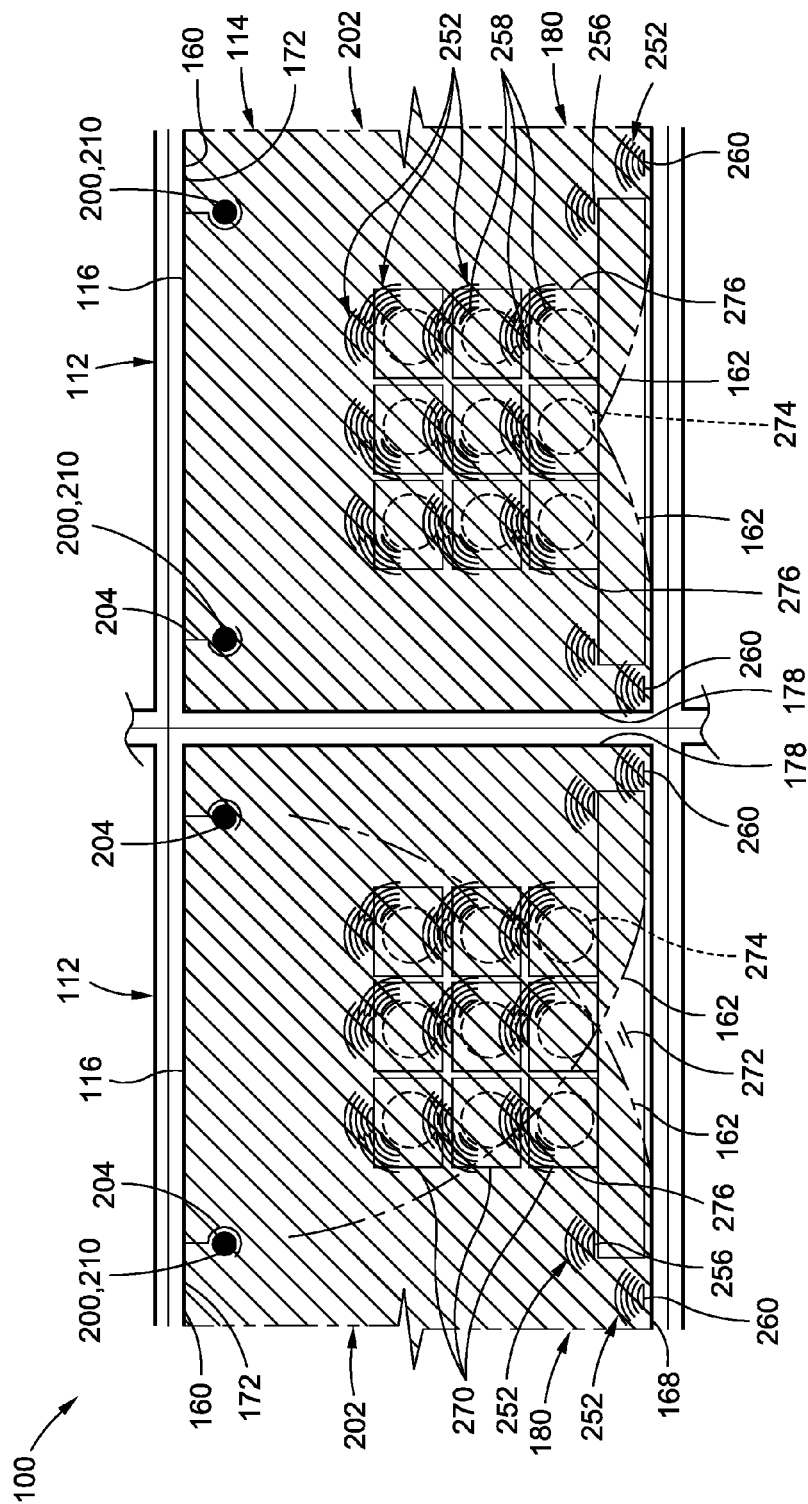
FIG. 9 is an end cross-sectional view of the storage rack of FIG. 8 illustrating a pair of back-to-back shelving units and showing in crosshatch the defined portion associated with each shelf antenna for activating RFID tags located within the respective defined portion.

FIG. 9 is an end cross-sectional view of the storage rack 112 of FIG. 8 illustrating a pair of back-to-back shelving units 116, each having an outer boundary 160 defined in part by the perspective RF blocking material 168 along the top and bottom wall 174 and along the back wall 178 of the shelving unit 116. Shown in crosshatch in each one of the shelving units 116 are the partially overlapping defined portions 162 associated with the interrogation signals 202 omni-directionally radiated by each one of the parallel lengthwise portions 232 of the leaky coaxial cable 210. The interrogation signal 202 within each shelving unit 116 is confined within the outer boundary 160 of that shelving unit 116, with the exception of the open side 180 from which the interrogation signal 202 may extend. As shown in FIG. 9, the interrogation signal 202 activates the RFID tags 250 located on the containers 276 and on the pallets 272, causing the RFID tags 250 to emit a response signal 252 which is received by the shelf antenna 200.

In an one of the examples disclosed herein, the inventory management system 100 may be configured to operate in any one of a variety of RFID spectrums. For example, the RFID readers 126 shelf antennas 200, and RFID tags 250 may be configured to operate in the ultra-high frequency spectrum (UHF) of 300 MHz to 3 GHz, and more preferably between approximately 860-960 MHz to provide a read range that is compatible with a shelf system 108 that is sized for storing items with dimensions on the order of several feet to dozens of feet. In one example, the system may be configured to operate in the 903-915 MHz range, and more specifically at approximately 915 MHz. In another example, the system may be configured to operate in the 865-868 MHz range. In a still further example, the system may be configured to operate in the 916-924 MHz range and/or in the 952-958 MHz range. However, the system may be configured to operate in other frequencies including the low-frequency (LF) band of from 30 KHz to 300 KHz. For example, the system may be configured to operate within a frequency band of 125-136 KHz such as at 125 KHz, or at 134 KHz. In another example, the system may be configured operate within a high-frequency (HF) range of from 3-30 MHz, such as at 13.56 MHz. In still other examples, the system may be configured to operate within a super-high-frequency (SHF) range of from 3-30 GHz, such as at 2.45 GHz. It should be noted that the RFID interrogation or operating frequency is not constrained to the frequency/spectrum management plan of any particular country, but rather is adaptable and configurable by RFID reader vendor.

FIG. 10 is a fisheye perspective view of an example of a shelving unit 116 having an outer boundary 160 defined by RF blocking material 168. The shelving unit 116 contains a single shelf antenna 200 for activating one or more pallet tags 256 mounted on the pallet 272, material tags 258 mounted on opposite ends 278 of the containers 276 and the material rolls 274, and system health tags 260 mounted directly on the bottom wall 174 of the shelving unit 116. In the example shown, the outer boundary 160 of the shelving unit 116 has a three-dimensional orthogonal shape defined by the RF blocking material 168 lining or forming the top wall 172, the bottom wall 174, the end walls 176, and the back wall 178 of the shelving unit 116.

Referring still to FIG. 10, in any the examples disclosed herein, the RF blocking material 168 may be formed of any electrically conductive material including, but not limited to, steel, aluminum, copper, silver, any metallic material, any conductive non-metallic material, or any combination of materials. For example, the RF blocking material 168 may be a conductive mesh 170 such as a metal mesh having a plurality of perforations. In a specific example, the RF blocking material 168 may be a wire mesh. In other examples, the RF blocking material 168 may be formed of perforated sheet metal (not shown). Regardless of whether the RF blocking material 168 is a conductive mesh 170 or perforated sheet metal, the perforations in the RF blocking material 168 may be sized to allow the passage of water such as water sprayed by a fire sprinkler system for fire protection. The perforations are preferably substantially smaller (e.g., less than 1 percent) than the wavelength of the interrogation signal 202 and response signals 252 such that the RF blocking material 168 may effectively block the passage of such signals. For example, for an inventory management system 100 operating at approximately 915 MHz, the wavelength is approximately 13 inches such that the perforations in the RF blocking material 168 preferably have a maximum size (e.g., a width or diameter) of no greater than approximately 0.13 inch.

Figure 11:
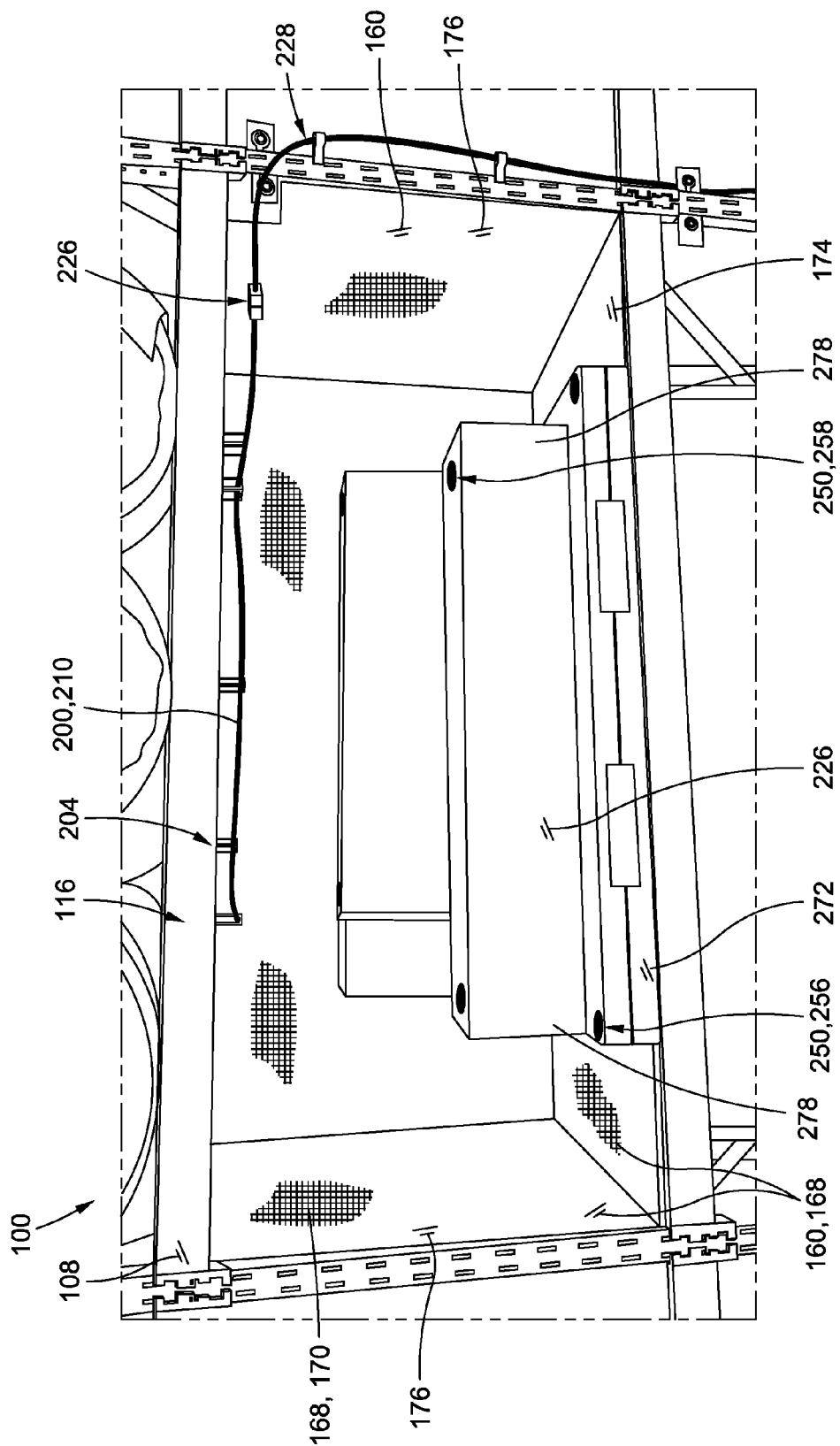
FIG. 11 is a perspective view of an example of a development prototype of a inventory management system installed in a shelving unit.

FIG. 11 is a perspective view of an example of a developmental prototype of the inventory management system 100 incorporated into a single shelving unit 116 of a shelf system 108 in which the adjacent shelving units 116 are devoid of shelf antennas 200 and RFID tags 250. In the example shown, the shelving unit 116 has a single shelf antenna 200 configured as a leaky coaxial cable 210. The RF blocking material 168 comprises a relatively fine-gauge wire mesh that is supported on the bottom wall 174 by a load-bearing wire panel which, in turn, is supported by load-bearing horizontal and vertical beams. The end walls 176 and back wall 178 of the shelving unit 116 are also lined with wire mesh for RF blocking. The tracked items 270 within the shelving unit 116 include several containers 276 of material rolls 274 each having RFID tags 250 on opposite ends 278 of the container 276. The containers 276 are supported on a pallet 272 which also includes RFID tags 250 on each of the four pallet 272 corners.

Figure 12:
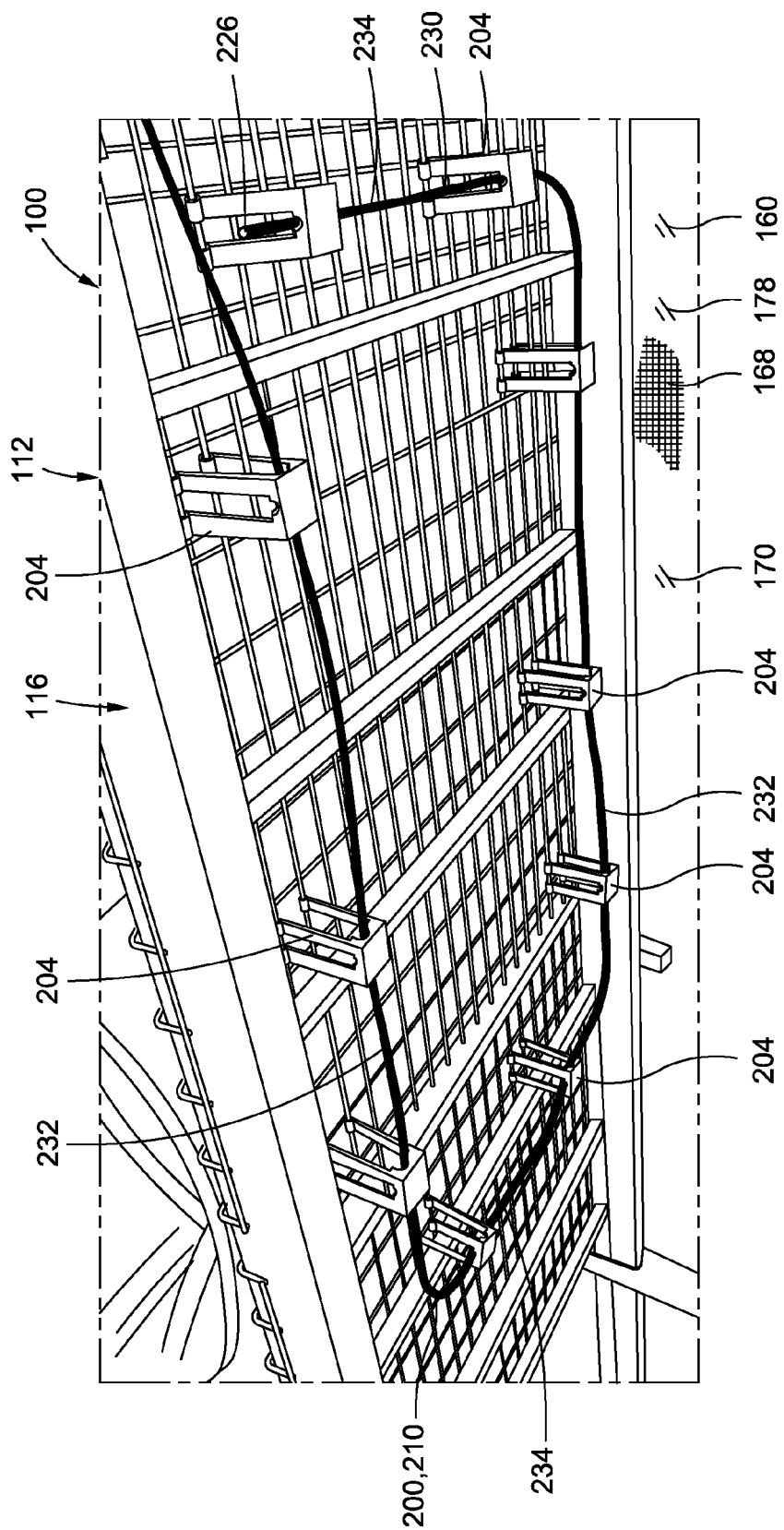
FIG. 12 is a further perspective view of the development prototype of FIG. 10 illustrating an example of shelf antenna brackets for mounting a leaky coaxial cable shelf antenna to the shelving unit.

FIG. 12 is a further perspective view of the developmental prototype of FIG. 11 illustrating the leaky coaxial cable 210 supported from a wire panel of the top wall 172 of the shelving unit 116 using a plurality of shelf antenna mounting brackets 204. As indicated above, RF blocking material 168 (e.g., wire mesh) is omitted from the top wall 172 because the shelving unit 116 directly above is devoid of a shelf antenna 200 and RFID tags 250 for the developmental prototype.

FIG. 13 is a partially cutaway illustration of a lengthwise portion of a leaky coaxial cable 210 as may be incorporated into the inventory management system 100. The leaky coaxial cable 210 has a solid inner conductor 212 or core (e.g., copper rod or tubing), surrounded by a dielectric material 214 (e.g., foam, plastic), which is in turn surrounded by an outer conductor 216 (e.g., copper coating or cladding), covered by an outer shield 220 (e.g., rubber, plastic, etc.). The outer conductor 216 may include a plurality of openings 218 (e.g., gaps, slots, etc.) at spaced intervals along the length of the leaky coaxial cable 210. The openings 218 allow for the passage of interrogation signals 202 through the outer conductor 216, and also allow for the receipt of response signals 252 emitted by the RFID tags 250. In some examples, the leaky coaxial cable 210 may have an outer diameter in the range of from 0.6 to 2.0 inch, although the leaky coaxial cable 210 may be provided in diameters of less than 0.6 inch and greater than 2.0 inch.

FIG. 14 is a cross-sectional view of a leaky coaxial cable 210 illustrating the omni-directional radiation of an interrogation signal 202 as a result of having openings 218 spaced around the circumference of the outer conductor 216 as shown in FIG. 13. However, in an embodiment not shown, a leaky coaxial cable 210 may be configured to radiate interrogation signals 202 along a specific angular range, instead of omni-directionally (e.g., 360 degrees). For example, for a leaky coaxial cable 210 mounted to a top wall 172 of a shelving unit 116, the outer conductor 216 of the leaky coaxial cable 210 may be provided with openings 218 that limit radiation of the interrogation signal 202 to within a 180-degree arc (not shown).

FIG. 15 shows an example of a shelf antenna mounting bracket 204 as may be implemented for mounting a leaky coaxial cable 210 to a wire panel of the configuration illustrated in FIG. 12. The upper end of the vertical legs of the shelf antenna mounting bracket 204 may include hooked feet, each of which may be sized and configured to engage or partially wrap around a wire of the wire panel. The lower end of the shelf antenna mounting bracket 204 may include a pair of semi-cylindrical grooves oriented at 90° relative to one another and sized complementary to the outer diameter of the leaky coaxial cable 210. The grooves may be slightly undersized to allow for snug, captive support of the leaky coaxial cable 210, while allowing for removal and/or adjustment of the position of the leaky coaxial cable 210 relative to the antenna mounting bracket 204 during installation, re-configuring, and/or maintenance/support. As may be appreciated, the leaky coaxial cable 210 may be mounted to the shelving unit 116 by any one of a variety of different bracket configurations, and is not limited to the configuration shown in FIG. 15. Advantageously, as mentioned above, the antenna mounting bracket 204 may be provided in a configuration that allows the leaky coaxial cable 210 in a shelving unit 116 to be readily re-routed and/or re-configured to be compatible with the shape and/or orientation of the tracked items 270 such that the radiation pattern and size is complementary to the location of the RFID tags 250 within the shelving unit 116 in accordance with the examples disclosed herein.

Figure 17:
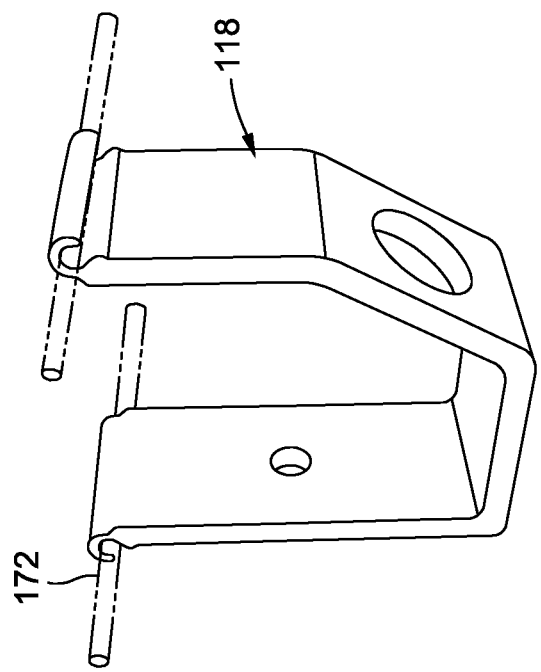
FIG. 17 is a perspective view of an example of the light mounting bracket of FIG. 16.
Figure 16:
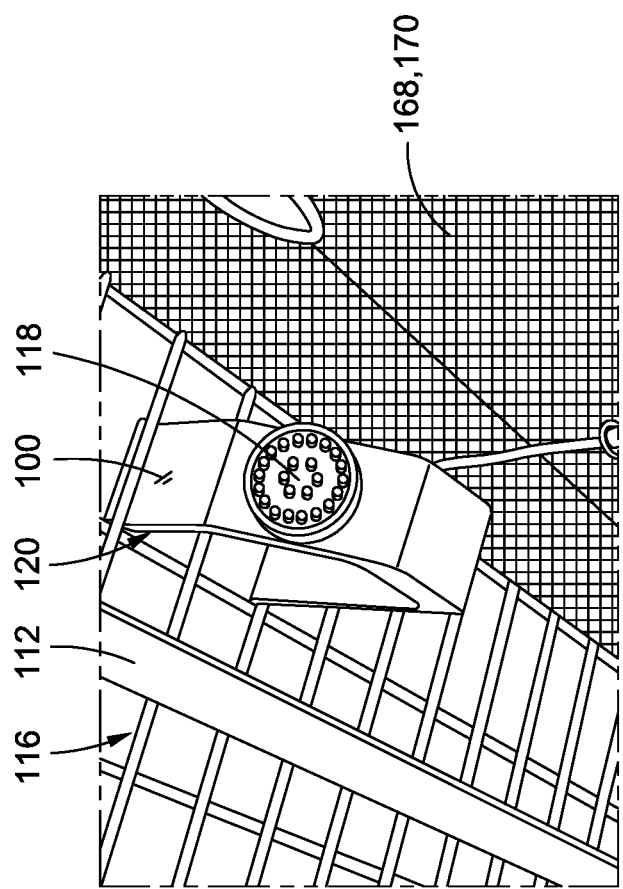
FIG. 16 is a perspective view of an example of a light mounting bracket for mounting an indication light to a wire shelf of the shelving unit.

FIG. 16 is a perspective view of an example of an indicator light 118 mounted to the top wall 172 of the shelving unit 116. FIG. 17 is a perspective view of an example of the light mounting bracket 120 of FIG. 16. In the example shown, the indicator light 118 is supported by a light mounting bracket 120 coupled to the wire panel of the top wall 172 of the shelving unit 116. The upper ends of the shelving unit 116 may be configured similar to the shelf antenna mounting bracket 204 having hooked feet sized and configured to partially wrap around the wire panel. However, the light mounting bracket 120 may be coupled to the shelving unit 116 by means other than the example shown in FIGS. 16-17. The light mounting bracket 120 may optionally be implemented for supporting one or more sensors (not shown) using the indicator light interface for co-locating the indicator light 118 and sensor(s) in a shelving unit 116 for monitoring environmental parameters of a storage area, such as temperature and/or humidity of a freezer.

As mentioned above, each indicator light 118 is associated with one of the shelving units 116 and is in communication with the system controller 130. The system controller 130 is configured to cause an indicator light 118 to illuminate for the purpose of indicating the location of a shelving unit 116 containing a tracked item 270 to removed and/or replaced. In addition, the system controller 130 may be configured to cause an indicator light 118 to illuminate for the purpose of indicating the location of a shelving unit 116 into which a tracked item 270 (e.g., a new material roll) is to be placed. Furthermore, the system controller 130 may cause an indicator light 118 to illuminate upon the system controller 130 determining the occurrence of an anomaly or malfunction in the shelf antenna 200 and/or the RFID reader 126 assigned to the shelving unit 116.

FIG. 18 is a side view of a storage rack 112 comprised of four vertically-stacked tiers 114 of shelving units 116 each containing a pair of leaky coaxial cable 210 shelf antennas 200 including a first shelf antenna 206 and a second shelf antenna 208 arranged in laterally spaced relation to one another. FIG. 19 is a fisheye perspective view of an example of a shelving unit 116 containing a first shelf antenna 206 and a second shelf antenna 208. The first shelf antenna 206 is routed and tuned such that only pallet tags 256 and material tags 258 in the first defined portion 164 (FIG. 18) respond only to the interrogation signal from the first shelf antenna 206, and the second shelf antenna 208 (FIG. 18) is routed and tuned such that only pallet tags 256 and material tags 258 located in the second defined portion 166 respond only to the interrogation signal from the second shelf antenna 208. As can be seen, the first defined portion 164 is non-overlapping with the second defined portion 166. The response signals 252 emitted by the RFID tags 250 located in the first boundary are not received at the second shelf antenna 208, and response signals 252 emitted by the RFID tags 250 located in the second boundary are not received at the first shelf antenna 206. As described above with regard to FIG. 8, the reduced size of the non-overlapping defined portions 164, 166 reduces the total quantity of response signals 252 that are generated, which advantageously reduces the total amount of data that the RFID reader 126 and/or system controller 130 are required to process. Furthermore, as shown in FIGS. 18-19, each container 276 can have an RFID tag 250 on each container end 278 which ensures that one of the RFID tags 250 will always be activated by an interrogation signal 202 regardless of the left-right orientation of the container 276 within the shelving unit 116.

Figure 20:
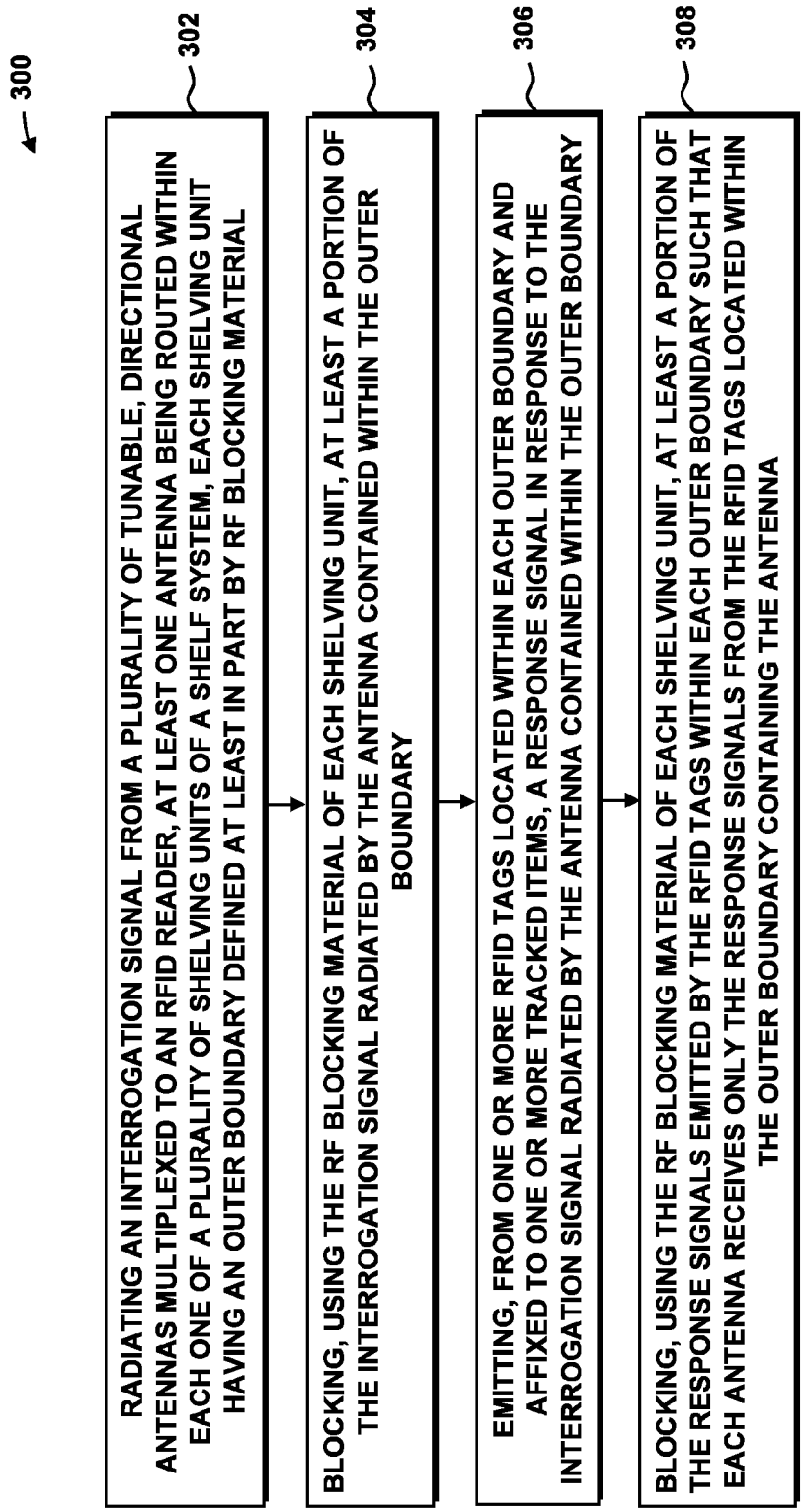
FIG. 20 is an illustration of a flowchart having one or more operations included in a method of managing inventory.

Referring to FIG. 20 and with additional reference to FIGS. 1-19, shown is a flowchart having one or more operations included in a method 300 of managing inventory. The inventory comprises a plurality of tracked items 270. Although the present disclosure describes the tracked items 270 as rolls of shelf-life-limited composite material (e.g., prepreg) optionally stacked on pallets 272, the tracked items 270 may include any one or more of a variety of perishable and/or non-perishable items of any quantity, size, shape, and configuration, without limitation.

Step 302 of the method includes radiating an interrogation signal 202 from a plurality of shelf antennas 200 routed within a plurality of shelving units 116 of a shelf system 108. As mentioned above, at least some of the shelving units 116 having at least one shelf antenna 200, and an outer boundary 160 defined at least in part by RF blocking material 168. The step of radiating the interrogation signals 202 from the plurality of shelf antennas 200 may be performed simultaneously. In addition, the radiating of the interrogation signals 202 may be performed continuously, periodically, in a repeating pattern, or on command by manual triggering such as on an as-needed basis. As indicated above, each one of the shelf antennas 200 is multiplexed to an RFID reader 126 via a multiplexing device 124 (e.g., see FIG. 3). The RF blocking material 168 forms a Faraday cage such that interrogation signals 202 radiated by the shelf antennas 200 and/or response signals 252 emitted by the RFID tags 250 are heavily attenuated or blocked from passing through the RF blocking material 168.

The step of radiating an interrogation signal 202 from a shelf antenna 200 may comprise radiating an interrogation signal 202 from a leaky coaxial cable 210 having an open loop shape 230 as shown in FIGS. 7, 8, 12, and 19. In addition, the step of radiating the interrogation signal 202 from the shelf antenna 200 may include radiating an interrogation signal 202 in a top-down direction from a leaky coaxial cable 210 located adjacent a top wall 172 of the outer boundary 160, as shown in FIGS. 8-12 and 18-19. Referring to FIGS. 18-19, in an embodiment, at least one of the shelving units 116 includes a first shelf antenna 206 and a second shelf antenna 208 arranged in laterally spaced relation to one another such that the step of radiating the interrogation signal 202 includes radiating an interrogation signal 202 from the first shelf antenna 206 such that only RFID tags 250 in a first defined portion 164 of the outer boundary 160 respond to the interrogation signal 202 from the first shelf antenna 206, and radiating an interrogation signal 202 from the second shelf antenna 208 such that only RFID tags 250 in a second defined portion 166 of the outer boundary 160 respond to the interrogation signal 202 from the second shelf antenna 208. As mentioned above, the first defined portion 164 is preferably non-overlapping with the second defined portion 166, as shown in FIGS. 6 and 18. The step of radiating the interrogation signal 202 may also include radiating the interrogation signal 202 such that only one of two RFID tags 250 located at opposing container ends 278 of a container 276 (e.g., a cardboard box) housing a material roll 274 is activated by the interrogation signal 202 and emits a response signal 252, as shown in FIGS. 8 and 18. However, the one or more shelf antennas 200 of a shelving unit 116 may be initially routed, tuned and subsequently re-configured (e.g., re-routed) and retuned based on the quantity and location of RFID tags 250 mounted on tracked items 270 to be stored in the shelving unit 116.

Step 304 of the method 300 includes blocking, using the RF blocking material 168 of each shelving unit 116, at least a portion of the interrogation signal 202 radiated by the shelf antenna 200 associated with the shelving unit 116. As described above, the RF blocking material 168 attenuates or prevents the passage of interrogation signals 202 and response signals 252 through the RF blocking material 168. In an embodiment, the steps of blocking the interrogation signal 202 and the response signals 252 includes blocking the interrogation signal 202 and response signals 252 using a metal mesh. As indicated above, the metal mesh may include perforations that allow for the passage of water through the metal mesh, and which thereby improves the fire safety effectiveness of the shelf system 108 as compared to a shelf system 108 where the walls of the shelving units 116 are non-perforated.

Step 306 of the method 300 includes emitting, from one or more RFID tags 250 located within each outer boundary 160 and affixed to one or more tracked items 270, a response signal 252 in response to the interrogation signal 202 radiated by the shelf antenna 200 mounted within the outer boundary 160. As mentioned above RFID tags 250 may include pallet tags 256 mounted on pallets 272, material tags 258 mounted on opposite ends of a material roll 274 or on opposite ends 278 of containers 276 housing the material rolls 274, and/or system health tags 260 mounted directly on the shelving units 116. The shelf antennas 200 are routed and tuned such that only RFID tags 250 located within a defined portion 162 of the outer boundary 160 of each shelving unit 116 are activated by the interrogation signal 202 of the shelf antenna 200 that is intended to activate such RFID tags 250, as described above. As shown in FIGS. 6-8 and 18, RFID tags 250 that are located outside of a defined portion 162 of the outer boundary 160 are non-activated by the interrogation signals 202.

Step 308 of the method 300 includes blocking, using the RF blocking material 168 of each shelving unit 116, at least a portion of the response signals 252 emitted by the RFID tags 250 within each outer boundary 160 such that each shelf antenna 200 receives only the response signals 252 from the RFID tags 250 located within the outer boundary 160 containing the shelf antenna 200. Upon activating one or more RFID tags 250 to emit response signals 252, the method may include transmitting the response signals 252 received by each shelf antenna 200 to a system controller 130. As indicated above, each one of the response signals has a unique identification number. The method may include correlating, using the system controller 130, the identification number encoded in each response signal 252 to one of the tracked items 270. The method may also include searching, using the system controller 130, a database 132 for a tracked item 270 from among a plurality of tracked items 270 in the current inventory of the database 132. In an embodiment where the tracked items 270 includes composite materials, the step of searching for the tracked item 270 from among a plurality of the tracked items 270 may include searching for a type of composite material, such as a type of prepreg material.

The method may further include identifying, using the system controller 130, a shelving unit 116 containing the tracked item 270 resulting from the database search. In this regard, a material handler such as a forklift operator may access the database 132 via a wireless device 136 such as a portable wireless device 136 (e.g., a tablet—FIGS. 4-5) mounted to a forklift 122 (FIGS. 3-4), and may search for a selected material using the search options illustrated in the exemplary user interface shown in FIG. 5 and described above. If multiple containers 276 of a material result from a database search, the system controller 130 may be programmed to select the material with the shortest remaining shelf life and/or the material that is the shortest distance from an entrance 104 and/or an exit 106 of the storage area 102. The search results 142 may be displayed on the user interface of the portable wireless device along with an electronic map 144 of the shelf system 108 highlighting the shelving unit 116 containing the material resulting from the database search.

After obtaining the search results 142, the forklift operator may drive the forklift 122 through the entrance 104 of the storage area 102 (e.g., the freezer), and locate the shelving unit 116 based on the electronic map 144. The forklift operator may locate the shelving unit 116 with assistance from an indicator light 118 of the shelving unit 116 which the system controller 130 may illuminate in response to the database search. After retrieving the material from the shelving unit 116, the forklift operator may drive the forklift 122 through the exit 106 and deliver the material such as to a composite layup area. The forklift 122 may return to the storage area 102, and return any unused material to the same shelving unit 116.

As indicated above, an antenna (not shown) and RFID reader (not shown) mounted at the entrance 104 and/or at the exit 106 of the storage area 102 may record the date and/or time that the material moves in and out of the storage area 102. In addition, the above-mentioned database 132 of inventory may be automatically updated each time a tracked item 270 is removed from and returned to a shelving unit 116, and whenever a tracked item 270 is replenished. Furthermore, if a tracked item 270 such as material is partially used and the remainder returned to the storage area 102, the system controller 130 is programmed to give the location of the shelving unit 116 containing the partially-used material a higher priority for withdrawal the next time the material is requested as a means to help clear out partially used and/or older material.

As noted above, the step of identifying the shelving unit 116 containing the tracked item 270 may include illuminating an indicator light 118 associated with the shelving unit 116 containing the tracked item 270. The indicator light 118 may aid a material handler in locating the shelving unit 116. Toward this end the method may further include displaying, using a display device 134 communicatively coupleable to the RFID reader 126, an electronic map 144 identifying the shelving unit 116 containing the tracked item 270 to be retrieved. FIGS. 4-5 illustrate an example of a portable wireless device 136 mounted on a forklift 122 and having a display of the electronic map 144 viewable by the forklift operator to indicate the location of the shelving unit 116 containing the tracked item 270.

Referring briefly to FIG. 4, as mentioned above, the display device 134 may be provided as a portable wireless device 136 mounted on a forklift 122 or other material handling device 121. The device antenna 135 may be a leaky coaxial cable 210 mounted on a material handling device 121 such as on a front portion of the forklift 122 such as on a roll cage and/or on the forklift mast used for vertically raising and lowering the forks of the forklift 122. In arrangements where a device antenna 135 is provided, the method may include radiating an interrogation signal 202 from the device antenna 135. For example, a forklift operator may command, via the user interface of the portable wireless device 136, the device antenna 135 to radiate the interrogation signal 202 when the forklift 122 approaches the location of the shelving unit 116 designated on the electronic map 144 of the portable wireless device 136. In other examples, the device antenna 135 may continuously radiate interrogation signals 202. The device antenna 135 may be configured and tuned to radiate the interrogation signal 202 in a radiation pattern (e.g., see FIG. 2) such that when the forklift 122 is directly in front of the shelving unit 116, only the RFID tags 250 within the shelving unit 116 directly in front of the forklift 122 are activatable by the interrogation signal 202 from the device antenna 135.

The method may further include receiving, at the device antenna 135, response signals 252 emitted by RFID tags 250 activated by the interrogation signal 202 radiated by the device antenna 135. In addition, the method may include comparing, using the portable wireless device 136 and or the system controller 130, the identification code of the response signals 252 emitted by RFID tags 250 activated by the interrogation signal 202 radiated by the device antenna 135 to the identification code of the response signals 252 emitted by RFID tags 250 activated by the interrogation signal 202 radiated by the shelf antennas 200. The method may additionally include generating, using the portable wireless device 136 or system controller 130, an indication when tag identifiers of the response signals 252 emitted by RFID tags 250 activated by the device antenna 135 match the tag identifiers of the response signals 252 emitted by RFID tags 250 activated by a single one of the shelf antennas 200.

In this manner, the device antenna 135 and device RFID reader 137 allows a material handler to confirm that, prior to removal of a tracked item 270 (e.g., a specific material roll) from a shelving unit 116, the material handling device 121 (e.g., forklift 122) is located at the shelving unit 116 identified in a database search for the tracked item (e.g., a specific material roll). The step of indicating the occurrence of the match using the portable wireless device 136 may include generating, using the portable wireless device, a visual indication (e.g., an illuminated green light for a positive match; an illuminated red light for a non-match) and/or generating an audible indication (e.g., a ringing bell noise for a positive match; a buzzing noise for a non-match) or any one of a variety of other visual, audible or tactile indication mediums. For examples where the forklift 122 includes the portable wireless device 136 and the above-described device antenna 135 (e.g., a leaky coaxial cable 210) operably connected to a device RFID reader 137, the device RFID reader 137 on the forklift 122 may be configured to read RFID tags 250 when picking up tracked items 270 (e.g., a pallet of prepreg material) at a shelving unit 116 inside the storage area 102 (e.g., freezer), and also read the RFID tags 250 of the tracked items when dropping off the tracked items 270 at a layup area outside of the storage area 102.

In some examples, the method may further include an auto-tuning capability for adjusting the power with which the interrogation signal 202 is radiated in one or more of the shelving units 116. In this regard, the method may include determining, at the RFID reader 126, a signal strength of the interrogation signal 202 radiated by a shelf antenna 200 and/or the response signals 252 received at the shelf antenna 200 in response to the interrogation signal 202, and adjusting, using the RFID reader 126, the power level of the interrogation signal 202 if the signal strength of the interrogation signal 202 and/or the response signals 252 is outside of a predetermined signal strength range. In this regard, the auto-tune capability include controlling and/or commanding the interrogation signal strength at the RFID reader 126 and/or controlling and/or commanding the sensitivity in receiving RF signals (e.g., response signals).

As mentioned above, the process of monitoring and adjusting the signal strength is performed autonomously by the inventory management system 100 without human intervention. In addition, auto-tuning may be performed in conjunction with the placement and shaping (e.g., the overall geometry and dimensions) of the leaky coaxial cable 210 in each shelving unit 116 to optimize the radiation of interrogation signals 202 and the receipt of response signals 252. The auto-tuning capability may also facilitate the selection and/or replacement of the type of RFID tags 250 for use in the inventory management system 100. For example, RFID tags may be selected that have improved RF characteristics such as orientation-insensitivity to obviate the need for mounting the RFID tags 250 in a specific orientation and/or location on a tracked item 270.

The method may additionally include the capability for system health monitoring of the shelf antennas 200, the RFID readers 126, and the multiplexing devices 124 for anomalies or malfunctions. In this regard, the method may include emitting, using a system health tag 260 mounted to a shelving unit 116, a health signal in response to the interrogation signal 202, and comparing, using the system controller 130, the power level of the health signal to a threshold power level. The method may further include determining, using a system controller 130, whether the power level of the health signal is below the threshold power level, which would indicate an anomaly associated with a shelf antenna 200 and/or the RFID reader 126 assigned to the shelving unit 116. The system controller 130 may also determine the existence of an anomaly or malfunction in the event that a system health tag 260 of a shelving unit 116 fails to emit a health signal in response to the interrogation signal 202. In addition, the known locations and identification of the system health tags 260 in each shelving unit 116 may facilitate the above-described auto-tuning capability with regard to the placement and shaping of the leaky coaxial cable 210 in each shelving unit 116 and/or with regard to adjusting, controlling, and/or commanding the interrogation signal strength and/or the response signal receipt sensitivity at the RFID reader 126.

In the event that an anomaly or malfunction is detected in one or more shelf antennas 200, RFID readers 126, and/or multiplexing devices 124, the system controller 130 may highlight the malfunctioning shelving unit 116 on an electronic map 144 of a display device 134 such as a wireless tablet. Alternatively or additionally, the system controller 130 may cause the indicator light 118 of the affected shelving unit 116 to illuminate so that maintenance personnel can locate the shelving unit 116 inside the storage area 102 (e.g., freezer) for repair and/or replacement of malfunctioning components.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. An inventory management system, comprising:
   an RFID reader;
   a multiplexing device operably connected to the RFID reader;
   a plurality of shelving units, each shelving unit having an outer boundary defined at least in part by RF blocking material;
   a plurality of shelf antennas multiplexed to the RFID reader via the multiplexing device, at least one shelf antenna routed within each shelving unit and tuned such that only RFID tags within the outer boundary of the shelving unit respond to an interrogation signal; and
   at least one of the shelving units has two or more shelf antennas arranged in laterally spaced relation to one another, the two or more shelf antennas are each configured to simultaneously radiate an interrogation signal within a defined portion of physical space that is non-overlapping with the defined portion of the interrogation signal radiated by the other of the two or more shelf antennas.

2. The inventory management system of claim 1, wherein: at least one of the shelf antennas is a leaky coaxial cable configured to radiate interrogation signals and receive response signals only from RFID tags located within the outer boundary containing the leaky coaxial cable.

3. The inventory management system of claim 2, wherein: the leaky coaxial cable has an open loop shape.

4. The inventory management system of claim 1, wherein: the RFID reader is configured to receive one or more response signals from one or more RFID tags via the shelf antenna, and adjust a power level of the interrogation signal if a signal strength of one or more of the response signals is outside of a predetermined signal strength range.

5. The inventory management system of claim 1, further including:
   an indicator light associated with each one of the shelving units, each indicator light being in communication with the RFID reader and configured to illuminate for at least one of:
      indicating a shelving unit containing a tracked item to be moved relative to the shelving unit; and
      indicating a shelving unit having an anomaly associated with the shelf antenna and/or the RFID reader assigned to the shelving unit.

6. The inventory management system of claim 1, wherein: the RF blocking material comprises metal mesh.

7. The inventory management system of claim 1, wherein the RFID tags include at least one of:
   one or more material RFID tags on one or more material rolls; and
   one or more pallet RFID tags located on at least one pallet.

8. The inventory management system of claim 7, wherein: each material roll is housed within a container having an RFID tag located at each one of opposing ends of the container.

9. The inventory management system of claim 1, wherein:
   the two or more shelf antennas include a first shelf antenna and a second shelf antenna arranged in laterally spaced relation to one another;
   the first shelf antenna being routed and tuned such that only RFID tags associated with a pallet and/or a material roll located in a first defined portion of the outer boundary respond to an interrogation signal from the first shelf antenna;
   the second shelf antenna being routed and tuned such that only RFID tags associated with a pallet and/or a material roll located in a second defined portion of the outer boundary respond to an interrogation signal from the second shelf antenna; and
   the first defined portion non-overlapping the second defined portion.

10. The inventory management system of claim 1, further including:
    a system health tag mounted to one or more of the shelving units, the system health tag configured to emit a health signal in response to the interrogation signal;
    a system controller connected to the RFID reader and configured to indicate an anomaly associated with at least one of the shelf antenna and the RFID reader assigned to the shelving unit upon an occurrence of at least one of the following:
       a power level of the health signal is below a threshold power level; and
       the system health tag fails to emit a health signal.

11. The inventory management system of claim 1, further including:
    a display device communicatively coupleable to the RFID reader and configured to display an electronic map identifying a shelving unit containing a tracked item to be moved.

12. The inventory management system of claim 11, wherein:
    the display device is a portable wireless device.

13. The inventory management system of claim 12, further including:
    a device RFID reader operably connected to the portable wireless device;
    a device antenna operably connected to the device RFID reader and configured to radiate an interrogation signal generated by the device RFID reader and receive response signals emitted by RFID tags; and the portable wireless device configured to generate an indication when the response signals emitted by RFID tags activated by the interrogation signal from the device antenna match the response signals emitted by RFID tags activated by the interrogation signal from one of the shelf antennas.

14. The inventory management system of claim 13, wherein:
the device antenna is a leaky coaxial cable mounted on a material handling device.

15. An inventory management system, comprising:
an RFID reader;
a multiplexing device operably connected to the RFID reader;
a plurality of shelving units of a storage rack of a shelf system located in a refrigerated area, each shelving unit having an outer boundary defined at least in part by RF blocking material;
a plurality of tunable shelf antennas multiplexed to the RFID reader via the multiplexing device, at least one shelf antenna routed within each shelving unit and tuned such that only RFID tags within the outer boundary of the shelving unit respond to an interrogation signal, at least one of the shelving units has two or more shelf antennas arranged in laterally spaced relation to one another, the two or more shelf antennas are each configured to simultaneously radiate an interrogation signal within a defined portion of physical space that is non-overlapping with the defined portion of the interrogation signal radiated by the other of the two or more shelf antennas; and
an indicator light associated with each one of the shelving units and configured to illuminate for indicating a shelving unit containing a tracked item to be moved, the tracked item having at least one of the RFID tags affixed thereto.

16. A method of managing inventory, comprising:
radiating an interrogation signal from a plurality of shelf antennas multiplexed to an RFID reader, at least one shelf antenna being routed within each one of a plurality of shelving units of a shelf system, each shelving unit having an outer boundary defined at least in part by RF blocking material, at least one of the shelving units having two or more shelf antennas arranged in laterally spaced relation to one another and configured to simultaneously radiate an interrogation signal within a defined portion of physical space that is non-overlapping with the defined portion of the interrogation signal radiated by the other of the two or more shelf antennas;
blocking, using the RF blocking material of each shelving unit, at least a portion of the interrogation signal radiated by the shelf antenna contained within the outer boundary;
emitting, from one or more RFID tags located within each outer boundary and affixed to one or more tracked items, a response signal in response to the interrogation signal radiated by the shelf antenna contained within the outer boundary; and
blocking, using the RF blocking material of each shelving unit, at least a portion of the response signals emitted by the RFID tags within each outer boundary such that each shelf antenna receives only the response signals from the RFID tags located within the outer boundary containing the shelf antenna.

17. The method of claim 16, wherein the step of radiating an interrogation signal from the plurality of shelf antennas comprises:
radiating the interrogation signal from a leaky coaxial cable.

18. The method of claim 17, wherein the step of radiating an interrogation signal from a leaky coaxial cable comprises:
radiating the interrogation signal from a leaky coaxial cable having an open loop shape.

19. The method of claim 16, wherein the two or more shelf antennas within the at least one of the shelving units includes a first shelf antenna and a second shelf antenna arranged in laterally spaced relation to one another, the step of radiating an interrogation signal from the plurality of shelf antennas includes:
radiating an interrogation signal from the first shelf antenna such that only RFID tags located in a first defined portion of the outer boundary respond to the interrogation signal from the first shelf antenna;
radiating an interrogation signal from the second shelf antenna such that only RFID tags located in a second defined portion of the outer boundary respond to the interrogation signal from the second shelf antenna; and
the first defined portion non-overlapping the second defined portion.

20. The method of claim 16, wherein the step of radiating an interrogation signal from a plurality of shelf antennas comprises:
radiating the interrogation signal such that only one of two RFID tags respectively located at opposing ends of a container housing a material roll is activated by the interrogation signal and emits the response signal.

21. The method of claim 16, further including:
transmitting the response signals received by each shelf antenna to a system controller, each one of the response signals having a unique identification number;
correlating, using a system controller connected to the RFID reader, the identification number encoded in each response signal to one of the tracked items;
searching, using the system controller, a database for a tracked item from among a plurality of the tracked items; and
identifying, using the system controller, a shelving unit containing the tracked item resulting from the database search.

22. The method of claim 21, wherein the step of identifying the shelving unit containing the tracked item comprises:
illuminating an indicator light associated with the shelving unit containing the tracked item resulting from a search of the database.

23. The method of claim 21, further including:
displaying, using a display device communicatively coupled to the RFID reader, an electronic map identifying the shelving unit containing the tracked item resulting from a search of the database.

24. The method of claim 23, wherein the display device comprises a portable wireless device, the method further including:
radiating an interrogation signal from a device antenna mounted on a material handling device, the device antenna operably connected to the portable wireless device via a device RFID reader;
receiving, at the device antenna, response signals emitted by RFID tags;
comparing response signals emitted by RFID tags activated by the interrogation signal radiated by the device antenna to response signals emitted by RFID tags activated by the interrogation signal radiated by the shelf antennas; and generating, using the portable wireless device, an indication when tag identifiers of the response signals emitted by RFID tags activated by the device antenna match the tag identifiers of the response signals emitted by RFID tags activated by one of the shelf antennas.

25. The method of claim 16, further including:

determining, at a system controller coupled to the RFID reader, a signal strength of at least one of the interrogation signal and the response signals received in response to the interrogation signal; and adjusting, using the RFID reader, a power level of the interrogation signal if the signal strength of the interrogation signal or the response signals is outside of a predetermined signal strength range.

26. The method of claim 16, wherein the steps of blocking, using the RF blocking material, at least a portion of the interrogation signal and the response signal comprise:

blocking at least a portion of the interrogation signal and the response signal using a metal mesh.

27. The method of claim 16, further including:

emitting, using a system health tag mounted to a shelving unit, a health signal in response to the interrogation signal;

receiving the health signal at the RFID reader;

comparing, using a system controller connected to the RFID reader, a power level of the health signal to a threshold power level; and determining, using the system controller, whether the power level of the health signal is below the threshold power level to indicate an anomaly associated with at least one of the shelf antenna and the RFID reader assigned to the shelving unit.

28. A method of managing inventory, comprising:

radiating an interrogation signal from a plurality of shelf antennas multiplexed to an RFID reader, at least one shelf antenna being routed within each one of a plurality of shelving units of a shelf system, each shelving unit having an outer boundary defined at least in part by RF blocking material;

blocking, using the RF blocking material of each shelving unit, at least a portion of the interrogation signal radiated by the shelf antenna contained within the outer boundary;

emitting, from one or more RFID tags located within each outer boundary and affixed to one or more tracked items, a response signal in response to the interrogation signal radiated by the shelf antenna contained within the outer boundary;

blocking, using the RF blocking material of each shelving unit, at least a portion of the response signals emitted by the RFID tags within each outer boundary such that each shelf antenna receives only the response signals from the RFID tags located within the outer boundary containing the shelf antenna;

transmitting the response signals received by each shelf antenna to a system controller, each one of the response signals having a unique identification number;

correlating, using a system controller connected to the RFID reader, the identification number encoded in each response signal to one of the tracked items;

searching, using the system controller, a database for a tracked item from among a plurality of the tracked items; and identifying, using the system controller, a shelving unit containing the tracked item resulting from the database search.

29. The method of claim 28, wherein the step of identifying the shelving unit containing the tracked item comprises:

illuminating an indicator light associated with the shelving unit containing the tracked item resulting from a search of the database.

* * * * *